US011472257B2

(12) United States Patent
Sakai et al.

(10) Patent No.: US 11,472,257 B2
(45) Date of Patent: Oct. 18, 2022

(54) AIR-CONDITIONING CONTROL APPARATUS

(71) Applicant: DENSO CORPORATION, Kariya (JP)

(72) Inventors: Koji Sakai, Kariya (JP); Yasuhiro Sekito, Kariya (JP)

(73) Assignee: DENSO CORPORATION, Kariya (JP)

( * ) Notice: Subject to any disclaimer, the term of this patent is extended or adjusted under 35 U.S.C. 154(b) by 538 days.

(21) Appl. No.: 16/675,081

(22) Filed: Nov. 5, 2019

(65) Prior Publication Data
US 2020/0070627 A1 Mar. 5, 2020

Related U.S. Application Data

(63) Continuation of application No. PCT/JP2018/017717, filed on May 8, 2018.

(30) Foreign Application Priority Data

May 9, 2017 (JP) .............................. JP2017-093037
Jun. 5, 2017 (JP) .............................. JP2017-111018
Jan. 18, 2018 (JP) .............................. JP2018-006225

(51) Int. Cl.
*B60H 1/00* (2006.01)
*B60N 2/00* (2006.01)

(52) U.S. Cl.
CPC ..... *B60H 1/00742* (2013.01); *B60H 1/00764* (2013.01); *B60N 2/002* (2013.01)

(58) Field of Classification Search
CPC ............ B60H 1/00742; B60H 1/00764; B60N 2/002; B60W 50/0098; B60W 60/00253
See application file for complete search history.

(56) References Cited

U.S. PATENT DOCUMENTS

| 6,249,720 | B1 | 6/2001 | Kubota et al. |
| 6,357,244 | B1 | 3/2002 | Mori |
| 8,768,539 | B1 | 7/2014 | Clement et al. |
| 9,682,609 | B1 * | 6/2017 | Dudar ................ B60H 1/00764 |
| 11,358,434 | B2 * | 6/2022 | Porras ....................... B60L 1/02 |
| 2003/0121988 | A1 | 7/2003 | Rutyna et al. |
| 2004/0194479 | A1 | 10/2004 | Umebayashi et al. |
| 2006/0241836 | A1 | 10/2006 | Kachouh et al. |

(Continued)

FOREIGN PATENT DOCUMENTS

| DE | 69836846 T2 | 10/2007 |
| DE | 102014224108 A1 | 6/2016 |

(Continued)

OTHER PUBLICATIONS

U.S. Appl. No. 16/675,032, filed Nov. 5, 2019, Sakai.

*Primary Examiner* — Devon Russell
(74) *Attorney, Agent, or Firm* — Harness, Dickey & Pierce, P.L.C.

(57) ABSTRACT

An air-conditioning control ECU is an air-conditioning control apparatus mounted in an automated driving vehicle, and includes an occupant determining section that determines whether an occupant is in the automated driving vehicle, and a window operation controlling section that executes a window operation air-conditioning control for performing cabin air-conditioning when a determination result of the occupant determining section indicates the automated driving vehicle is in an unmanned traveling state.

20 Claims, 15 Drawing Sheets

(56) References Cited

U.S. PATENT DOCUMENTS

| | | | |
|---|---|---|---|
| 2013/0203400 A1 | 8/2013 | Ricci | |
| 2014/0262132 A1 | 9/2014 | Connell | |
| 2015/0099443 A1* | 4/2015 | Hirabayashi | B60H 1/00778 454/75 |
| 2015/0129192 A1* | 5/2015 | Boss | B60H 1/00878 165/223 |
| 2016/0090055 A1 | 3/2016 | Breed | |
| 2017/0282821 A1* | 10/2017 | Zych | G06Q 50/30 |
| 2017/0285642 A1* | 10/2017 | Rander | B60N 2/0244 |
| 2017/0327125 A1 | 11/2017 | Nordbruch | |
| 2022/0185069 A1* | 6/2022 | Kocher | B60H 1/00285 |

FOREIGN PATENT DOCUMENTS

| | | |
|---|---|---|
| JP | H11139155 A | 5/1999 |
| JP | 2000264039 A | 9/2000 |
| JP | 2001001787 A | 1/2001 |
| JP | 2001026214 A | 1/2001 |
| JP | 2001063347 A | 3/2001 |
| JP | 2015074236 A | 4/2015 |

\* cited by examiner

AIR-CONDITIONING CONTROL APPARATUS

CROSS REFERENCE TO RELATED APPLICATIONS

This application is a continuation application of international Patent Application No. PCT/JP2018/017717 filed on May 8, 2018, which designated the U.S. and claims the benefit of priority from Japanese Patent Application No. 2017-093037 filed on May 9, 2017, Japanese Patent Application No. 2017-111018 filed on Jun. 5, 2017, and Japanese Patent Application No. 2018-006225 filed on Jan. 18, 2018. The entire disclosure of all of the above applications are incorporated herein by reference.

TECHNICAL FIELD

The present disclosure relates to an air-conditioning control apparatus mounted in an automated driving vehicle.

BACKGROUND ART

Improvement of the temperature comfort when a person is on a vehicle has been requested. To address this, vehicle air-conditioning control systems have been proposed. Such a vehicle air-conditioning control system is a system that controls an air-conditioning apparatus mounted in an electric vehicle. The vehicle air-conditioning control system performs a pre-air-conditioning that provides the inside of the cabin with air for temperature control by operating a vehicle air-conditioning apparatus when an occupant gets off the vehicle to charge the battery for the vehicle and no person is in the cabin. After completion of charging the battery, the pre-air-conditioning is continued by using power from the battery. In this manner, the vehicle air-conditioning control system brings the inside cabin temperature at the time of riding of an occupant to an appropriate temperature.

SUMMARY

One aspect of the present disclosure is an air-conditioning control apparatus mounted in an automated driving vehicle, including an occupant determining section that is configured to determine whether an occupant is in the automated driving vehicle, and an air-conditioning controlling section that is configured to execute an air-conditioning control by exchanging an inside air in a vehicle cabin with an outside air when a determination result of the occupant determining section indicates the automated driving vehicle is in an unmanned state.

DESCRIPTION OF EMBODIMENTS

Development of automated driving vehicles has been promoted with a view to developing an automated driving vehicle capable of unmanned travel as well as assisting of the driver. Expected applications of such an automated driving vehicle include pickup of a passenger by unmanned travel, car sharing, or a driverless taxi.

When a pre-air-conditioning in a vehicle air-conditioning control system is applied as it is, the pre-air-conditioning is performed while the vehicle is stopping for charging the battery. For picking up an occupant at a location distant from there, it is necessary to perform automated driving while continuing air-conditioning. Continuing the air-conditioning by the vehicle air-conditioning apparatus causes deterioration in electricity efficiency or fuel efficiency, and causes a problem of reduction in traveling distance or the like.

In view of the above, embodiments of the present invention will be described with reference to attached drawings. For ease of understanding of the description, the same constituent in different drawings is denoted by the same symbol as much as possible, and overlapping description is omitted.

First Embodiment

Figure 1:
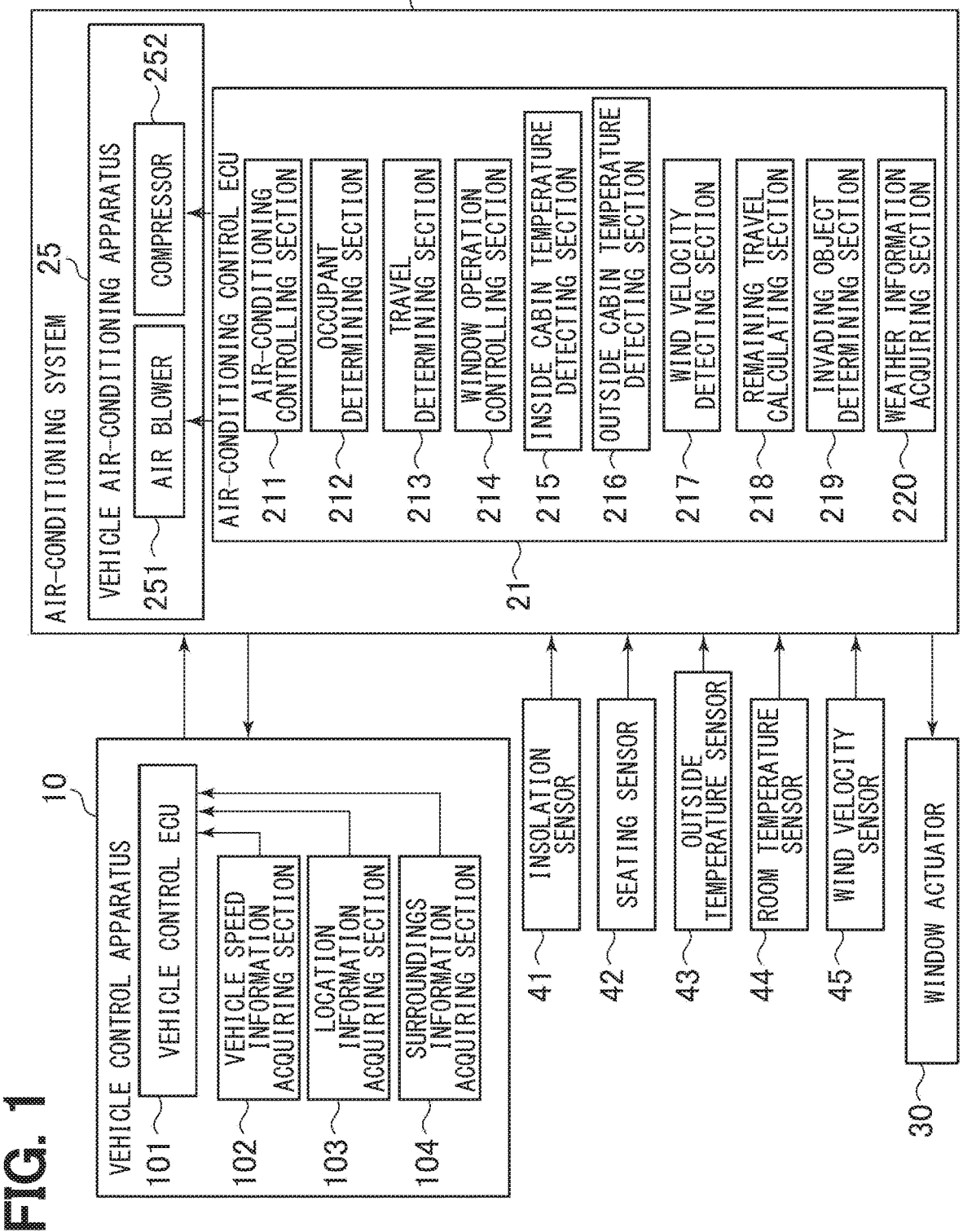
FIG. 1 is a block configuration diagram showing a functional configuration of an air-conditioning control ECU of a first embodiment.

With reference to FIG. 1, an air-conditioning control ECU (Electronic Control Unit) 21 according to a first embodiment is described. The air-conditioning control ECU 21 is provided in an air-conditioning system 20. The air-conditioning system 20 is mounted in an automated driving vehicle (not shown), and performs air-conditioning in the cabin.

The air-conditioning system 20 includes the air-conditioning control ECU 21 and a vehicle air-conditioning apparatus 25. The vehicle air-conditioning apparatus 25 includes an air blower 251 and a compressor 252. The compressor 252 constitutes a refrigerating cycle system included in the vehicle air-conditioning apparatus. The air blower 251 performs air-cooling and heating by blowing air to an evaporator constituting the refrigerating cycle system and a heater core. By driving only the air blower 251 without driving the refrigerating cycle, it is possible to supply the cabin with the circulating wind while suppressing power consumption.

The air-conditioning system 20 is capable of mutual communicating information with a vehicle control apparatus 10. The vehicle control apparatus 10 includes a vehicle control ECU 101, a vehicle speed information acquiring section 102, a location information acquiring section 103, and a surroundings information acquiring section 104. The vehicle control ECU 101 is mounted on an automated driving vehicle, and unifies driving operations such as starting, acceleration, deceleration, stopping, and steering of the automated driving vehicle.

The vehicle speed information acquiring section 102 is a section that acquires vehicle speed information including information indicating a vehicle speed of the automated driving vehicle or information regarding the vehicle speed. The information indicating the vehicle speed of the automated driving vehicle is vehicle speed data output from a vehicle speed sensor (not shown). The information regarding vehicle speed is location variation data output from the navigation system (not shown), and the vehicle speed is specified according to the location variation situation. The vehicle speed information acquiring section 102 outputs the acquired vehicle speed information to the vehicle control ECU 101. The vehicle control ECU 101 transmits the vehicle speed information to the air-conditioning control ECU 21.

The location information acquiring section 103 is a section that acquires location information specifying the location of the automated driving vehicle, on the basis of a GPS signal received by a GPS antenna, or a signal indicating the behavior of the automated driving vehicle output from the vehicle speed sensor, an acceleration sensor, or a gyro sensor. The location information acquiring section 103 outputs the acquired location information to the vehicle control ECU 101. The vehicle control ECU 101 transmits the location information to the air-conditioning control ECU 21.

The surroundings information acquiring section 104 is a section that acquires image data of the surroundings of the automated driving vehicle imaged by a camera, or target data of the surroundings of the automated driving vehicle acquired by a millimeter wave radar. The surroundings information acquiring section 104 outputs the acquired image data or target data to the vehicle control ECU 101. The vehicle control ECU 101 transmits the image data or the target data to the air-conditioning control ECU 21. To the air-conditioning control ECU 21, various data output from an insolation sensor 41, a seating sensor 42, an outside temperature sensor 43, a room temperature sensor 44, and a wind velocity sensor 45, as well as various sensor transmitted from the vehicle control ECU 101 is input.

The insolation sensor 41 detects the amount of insolation on the automated driving vehicle, and outputs the detected amount as insolation amount data to the air-conditioning control ECU 21. The seating sensor 42 detects that an occupant is on the automated driving vehicle, and outputs the detection result as occupant data to the air-conditioning control ECU 21.

The outside temperature sensor 43 detects the temperature in the vicinity of the outside of the automated driving vehicle, and outputs the detected temperature as outside temperature data to the air-conditioning control ECU 21. The room temperature sensor 44 detects the temperature in the cabin of the automated driving vehicle, and outputs the detected temperature as room temperature data to the air-conditioning control ECU 21.

The wind velocity sensor 45 detects wind velocity data indicating the wind velocity entering the cabin, and outputs the data to the air-conditioning control ECU 21. The wind velocity sensor 45 may directly detect the flow of air entering the cabin, and may indirectly estimate the flow of air entering the cabin, for example, from the flow of air introduced into the radiator.

The air-conditioning control ECU 21 operates the air blower 251 and the compressor 252, and operates a window actuator 30, on the basis of the vehicle speed information, location information, surroundings information, insolation amount data, occupant data, outside temperature data, room temperature data, and wind velocity data. The air-conditioning control ECU 21 is configured as a computer that includes, as hardware constituents, a processor or CPU, a storage section such as RAM and ROM, and an interface section for sending or receiving data. Next, functional constituents of the control apparatus are described.

The air-conditioning control ECU 21 (i.e., the processor) includes, as functional blocks, an air-conditioning controlling section 211, an occupant determining section 212, a travel determining section 213, a window operation controlling section 214, an inside cabin temperature detecting section 215, an outside cabin temperature detecting section 216, a wind velocity detecting section 217, a remaining travel calculating section 218, an invading object determining section 219, and a weather information acquiring section 220.

The air-conditioning controlling section 211 is a section that drives the refrigerating cycle system including the compressor 252 and the air blower 251, and performs air-conditioning in the cabin of the automated driving vehicle.

The occupant determining section 212 is a section that determines a ride state of an occupant on the automated driving vehicle on the basis of occupant data. When the occupant data does not indicates a ride by an occupant on the automated driving vehicle, the occupant determining section 212 determines that the automated driving vehicle is in an unmanned state. The occupant determining section 212 may determine whether the cabin is in an unmanned state on the basis of whether a signal of pick-up request remotely transmitted from a terminal such as a smartphone or a PC is received.

The travel determining section 213 is a section that determines a travel state of the automated driving vehicle on the basis of vehicle speed information and location information. When the vehicle speed information indicates a speed that is equal to or greater than a predetermined threshold speed, the travel determining section 213 determines that the automated driving vehicle is in a traveling state. As the information regarding the vehicle speed, location information may be used. Since a location variation with a time lapse of the automated driving vehicle can be grasped on the basis of the location information, it is possible to handle the location information as information indicating the speed of the automated driving vehicle. When the location information indicates a location variation corresponding to the velocity of a predetermined threshold speed or more, the travel determining section 213 determines that the automated driving vehicle is in a traveling state.

The window operation controlling section 214 is a section that outputs a window operation signal instructing a window actuator 30 to open or close a window. The window actuator 30 drives opening or closing of openable and closable window provided in the automated driving vehicle. There are a plurality of openable and closable windows provided in the automated driving vehicle depending on the seat arrangement, including left and right windows in the front seat, left and right windows in the rear seat, and a rear window. The window operation controlling section 214 executes a window operation air-conditioning control that performs cabin air-conditioning by operating a window provided in the automated driving vehicle, when the determination results of the occupant determining section 212 and the travel determining section 213 indicate the unmanned traveling state of the automated driving vehicle.

The inside cabin temperature detecting section 215 is a section that detects the inside cabin temperature of the automated driving vehicle on the basis of room temperature data.

The outside cabin temperature detecting section 216 is a section that detects the outside cabin temperature of the automated driving vehicle on the basis of outside temperature data.

The wind velocity detecting section 217 is a section that detects wind velocity information indicating a velocity of wind entering the cabin of the automated driving vehicle on the basis of wind velocity data.

The remaining travel calculating section 218 is a section that calculates a scheduled traveling time for which unmanned travel is expected to be performed until a person rides on the automated driving vehicle on the basis of location information. The remaining travel calculating section 218 calculates a scheduled traveling time on the basis of the current location of the automated driving vehicle, and a destination location where a person is scheduled to ride on.

The invading object determining section 219 is a section that determines whether there is an object that can invade into the cabin outside the automated driving vehicle on the basis of surroundings information. Examples of the object that can invade into the cabin include insects, birds, and humans. The invading object determining section 219 determines the possibility of invasion by an object on the basis of surroundings information and behavioral characteristics depending on the object.

The weather information acquiring section 220 is a section that acquires weather information of the periphery of the automated driving vehicle on the basis of location information. The weather information acquiring section 220 can obtain weather information corresponding to the location information from a weather information server or the like. The weather information acquiring section 220 can also estimate the ambient weather on the basis of insolation amount data. The weather information acquiring section 220 may determine weather on the basis of the data that is obtained by imaging by a rain sensor or a camera and acquired by the surroundings information acquiring section 104.

As described above, the air-conditioning control ECU 21 includes the occupant determining section 212 that determines a ride state of an occupant in the automated driving vehicle, and the window operation controlling section 214 serving as an air-conditioning controlling section that executes an air-conditioning control by exchanging an inside air in the cabin and an outside air when the determination result of the occupant determining section 212 indicates the automated driving vehicle is in an unmanned state.

According to the present embodiment, when it is determined that the vehicle is in an unmanned state, the air-conditioning control of exchanging air between inside the cabin and outside the cabin is executed. Therefore, it is possible to make the temperature inside the cabin approximate a more comfortable temperature by using the difference in the air temperature inside the cabin and the air temperature outside the cabin.

The air-conditioning control ECU 21 further includes the travel determining section 213 that determines a travel state of the automated driving vehicle. The window operation controlling section 214 executes a window operation air-conditioning control that performs the cabin air-conditioning by operating a window provided in the automated driving vehicle, when the determination results of the occupant determining section 212 and the travel determining section 213 indicate the unmanned traveling state of the automated driving vehicle.

In the present embodiment, when the vehicle is determined to be in an unmanned traveling state, the window operation air-conditioning control that is the intra-cabin air-conditioning of exchanging air between inside and outside the cabin by operating a window is executed. Therefore, it is possible to make the temperature inside the cabin approximate a more comfortable temperature by using the difference in the air temperature between inside the cabin and outside the cabin without relying only on the vehicle air-conditioning apparatus utilizing a refrigerating cycle. Further, it is possible to start operation at a temperature included in proper temperatures or at a temperature near proper temperatures even when a person rides on the vehicle in an unmanned traveling state, and the vehicle air-conditioning apparatus utilizing the refrigerating cycle is operated. Therefore, a load on the vehicle air-conditioning apparatus is also reduced.

The air-conditioning control ECU 21 according to the present embodiment further includes the inside cabin temperature detecting section 215 that detects the inside cabin temperature of the automated driving vehicle, and the outside cabin temperature detecting section 216 that detects the outside cabin temperature of the automated driving vehicle. The window operation controlling section 214 determines controlling conditions of the window operation air-conditioning control on the basis of the inside cabin temperature and the outside cabin temperature. Since it is possible to grasp the inside cabin temperature and the outside cabin temperature, it is possible to estimate how the temperature inside the cabin varies by operation of the window more accurately, and to set the quantity of operation of the window more appropriately.

In the air-conditioning control ECU 21 according to the present embodiment, the window operation controlling section 214 executes the window operation air-conditioning control in such a manner that the window operation air-conditioning control is not executed when the inside cabin temperature falls within a proper temperature range, and the window operation air-conditioning control is executed to make the inside cabin temperature approximate and fall within the proper temperature range when the inside cabin temperature does not fall within the proper temperature range. When the inside cabin temperature falls within the proper temperature range, the window operation air-conditioning control is not executed, so that unnecessary window operation can be avoided. When the inside cabin temperature does not fall within the proper temperature range, the window operation air-conditioning control is executed, and the window is operated to make the inside cabin temperature approximate and fall in the proper temperature range. Therefore, it is possible to make the temperature inside the cabin approximate a more comfortable temperature by using the difference in the air temperature between inside the cabin and outside the cabin.

In the air-conditioning control ECU 21 according to the present embodiment, as the window operation air-conditioning control, the window operation controlling section 214 increases the degree of opening of the window when the inside cabin temperature is higher than the proper temperature range and the inside cabin temperature is higher than the outside cabin temperature, or when the inside cabin temperature is lower than the proper temperature range and the inside cabin temperature is lower than the outside cabin temperature. When the inside cabin temperature is higher than the proper temperature range, lowering the inside cabin temperature will make the temperature inside the cabin approximate a comfortable temperature. In light of this, when the inside cabin temperature is higher than the outside cabin temperature, the window operation air-conditioning control is executed to lower the inside cabin temperature by increasing the degree of opening of the window and taking an outside air into the cabin. On the other hand, when the inside cabin temperature is lower than the proper temperature range, raising the inside cabin temperature will make the temperature inside the cabin approximate a comfortable temperature. In light of this, when the inside cabin temperature is lower than the outside cabin temperature, the window operation air-conditioning control is executed to raise the inside cabin temperature by increasing the degree of opening of the window and taking an outside air into the cabin.

In the air-conditioning control ECU 21 according to the present embodiment, as the window operation air-conditioning control, the window operation controlling section 214 decreases the degree of opening of the window when the inside cabin temperature is higher than the proper temperature range and the inside cabin temperature is not higher than the outside cabin temperature, or when the inside cabin temperature is lower than the proper temperature range and the inside cabin temperature is not lower than the outside cabin temperature. As described above, when the inside cabin temperature is higher than the proper temperature range, lowering the inside cabin temperature will make the temperature inside the cabin approximate a comfortable temperature. However, when the inside cabin temperature is not higher than the outside cabin temperature, the temperature will further rise if the air outside the cabin is taken in. Therefore, by reducing the degree of opening of the window, it is possible to prevent the inside cabin temperature from further departing from the proper temperature range, and it is possible to avoid an unnecessary window operation. On the other hand, as described above, when the inside cabin temperature is lower than the proper temperature range, raising the inside cabin temperature will make the temperature inside the cabin approximate a comfortable temperature. However, when the inside cabin temperature is not lower than the outside cabin temperature, the temperature will further lower if the air outside the cabin is taken in. Therefore, by reducing the degree of opening of the window, it is possible to prevent the inside cabin temperature from further departing from the proper temperature range, and it is possible to avoid an unnecessary window operation.

In the air-conditioning control ECU 21 according to the present embodiment, the travel determining section 213 acquires vehicle speed information including information indicating the vehicle speed or information associated with the vehicle speed of the automated driving vehicle, and the window operation controlling section 214 determines controlling conditions for the window operation air-conditioning control while reflecting the vehicle speed information. By determining the need of the opening and closing operation of the window while reflecting the vehicle speed information, and adjusting the degree of opening of the window, it is possible to perform the air exchange between inside and outside the cabin more appropriately.

In the air-conditioning control ECU 21 according to the present embodiment, the window operation controlling section 214 can stop the window operation air-conditioning control and close the window if the window is open when the vehicle speed information no longer indicates the automated driving vehicle is traveling at a speed equal to or greater than the predetermined threshold speed. When the automated driving vehicle is no longer in the traveling state at a speed of the threshold speed or more, and the vehicle becomes in a low speed state or in a stopped state, the effect of adjusting the temperature by air exchange decreases even when the window is open. On the other hand, if the window is open even though the automated driving vehicle has become in a low speed state or in a stopped state, fear of theft by an invading ill-intentioned third person or fear of entry of insects or birds increases. In light of this, in the present embodiment, it is possible to reduce the fear of theft or entry of foreign matter by stopping the window operation air-conditioning control, and closing the window if the window is open, when the vehicle speed information no longer indicates the automated driving vehicle is traveling at a speed equal to or greater than the predetermined threshold speed.

In the air-conditioning control ECU 21 according to the present embodiment, the window operation controlling section 214 adjusts the degree of opening of the window in the window operation air-conditioning control on the basis of vehicle speed information when the vehicle speed information indicates the automated driving vehicle is traveling at a speed equal to or more than a predetermined threshold speed, and execution of the window operation air-conditioning control is continued. As one example, since it is supposed that the amount of the air entering the cabin increases with the vehicle speed, it is possible to ensure the amount of exchanging air, while preventing the interior of the cabin from becoming stormy due to excessive intake of the air by narrowing the degree of opening of the window compared with the standard setting when the vehicle speed increases. In this case, the degree of opening of the window may be increased compared with the standard setting when the vehicle speed decreases.

In the air-conditioning control ECU 21 according to the present embodiment, the window operation controlling section 214 can reduce the degree of opening of the window as the speed of the automated driving vehicle indicated by the vehicle speed information decreases, rather than increases. Since insects or birds are more likely to enter at low vehicle speeds, the degree of opening of the window is reduced by narrowing the degree of opening of the window compared with the standard setting from this viewpoint.

The air-conditioning control ECU 21 according to the present embodiment further includes the wind velocity detecting section 217 that detects wind velocity information indicating a velocity of wind entering the cabin. The window operation controlling section 214 can determine controlling conditions of the window operation air-conditioning control while reflecting the wind velocity information. By executing the window operation air-conditioning control reflecting the wind velocity information that indicates the wind velocity entering the cabin likewise reflecting the vehicle speed, it is possible to perform air-exchanging between inside and outside the cabin more appropriately.

The air-conditioning control ECU 21 according to the present embodiment can further include the air-conditioning controlling section 211 that controls the vehicle air-conditioning apparatus capable of performing cabin air-conditioning using the air-conditioning air having a temperature adjusted by the refrigerating cycle system mounted in the automated driving vehicle, and the remaining travel calculating section 218 that calculates the scheduled traveling time for which unmanned travel continues until a person rides in the automated driving vehicle. When the time in which the inside cabin temperature falls within the proper temperature range by using the vehicle air-conditioning apparatus is equal to or less than the scheduled traveling time, the window operation controlling section 214 stops the window operation air-conditioning control, and closes the window if the window is open, and the air-conditioning controlling section 211 executes cabin air-conditioning by operating the refrigerating cycle. Also when it is conceivable that the inside cabin temperature cannot be fallen in the proper temperature range only by the window operation air-conditioning control, for example, when the outside cabin temperature is greatly deviated from the proper temperature range. In the present embodiment, when the time in which the inside cabin temperature falls within the proper temperature range by using the vehicle air-conditioning apparatus is equal to or less than the scheduled traveling time, the window operation air-conditioning control is stopped, and the window is closed if the window is open, and cabin air-conditioning where the refrigerating cycle system operates is executed, so that it is possible to bring the temperature in the cabin within the proper temperature range when a person rides on the automated driving vehicle. Also in this case, since the window operation air-conditioning control is preliminarily executed, it is possible to make the inside cabin temperature approximate the proper temperature range as much as possible. Therefore, it is possible to improve the electricity efficiency and the fuel efficiency compared with the case of not using the window operation air-conditioning control.

The air-conditioning control ECU 21 according to the present embodiment further includes the invading object determining section 219 that determines whether there is an object that can invade into the cabin outside the automated driving vehicle. When the determination result of the invading object determining section 219 indicates the existence of an object that can invade into the cabin, the window operation controlling section 214 does not perform the window operation air-conditioning control and closes the window if the window is open. By closing the window when there is an object that can invade the cabin, it is possible to prevent entry of an insect, a bird, or an ill-intentioned third person.

The air-conditioning control ECU 21 according to the present embodiment further includes the weather information acquiring section 220 that acquires weather information. When the weather information acquired by the weather information acquiring section 220 indicates bad weather, the window operation controlling section 214 does not perform the window operation air-conditioning control, and closes the window if the window is open. By closing the window when the periphery of the automated driving vehicle becomes bad weather, it is possible to prevent the rain from entering the cabin.

Next, with reference to FIGS. 2, 3, 4, 5, a control operation performed by the processor of the air-conditioning control ECU 21 is described. In step S101 of FIG. 2, the occupant determining section 212 acquires a riding state. In step S102 following step S101, the occupant determining section 212 determines whether the automated driving vehicle is in an unmanned state. When the automated driving vehicle is in an unmanned state, the process proceeds to step S103. When the automated driving vehicle is not in an unmanned state, the process returns.

In step S103, the travel determining section 213 acquires vehicle speed information. In step S104 following step S103, the travel determining section 213 determines whether the vehicle speed is equal to or more than the predetermined threshold speed. When the vehicle speed is the predetermined threshold speed or more, it is determined that the automated driving vehicle is in an unmanned traveling state, and the process proceeds to step S105. When the vehicle speed is not the predetermined threshold speed or more, it is determined as not being in an unmanned traveling state, and the process proceeds to step S107. In step S107, the process of closing the window if the window is open is executed, and the flow returns.

In step S105, the window operation controlling section 214 executes a window operation air-conditioning control. The window operation air-conditioning control is described with reference to FIG. 3 and FIG. 4.

Figure 3:
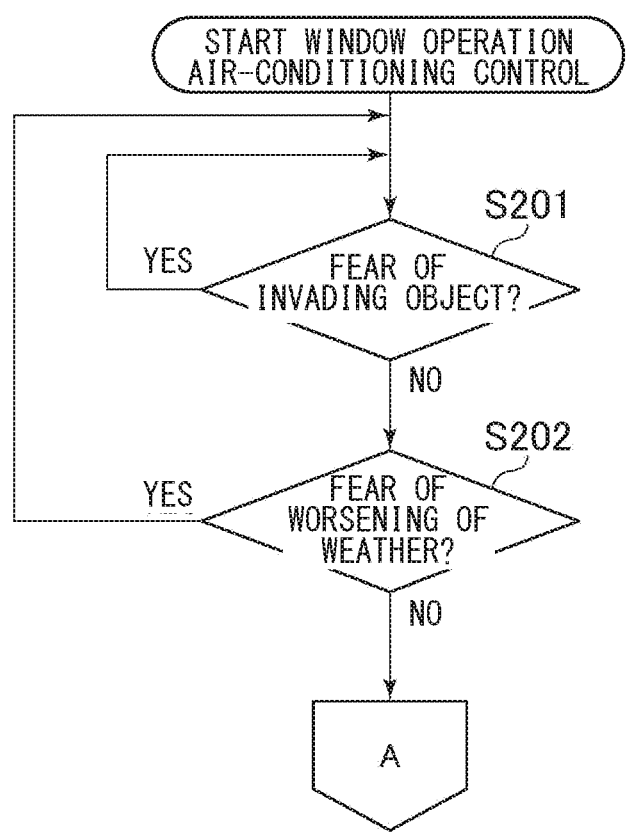
FIG. 3 is a flowchart for illustrating a processing of the air-conditioning control ECU of the first embodiment.

In step S201 of FIG. 3, the invading object determining section 219 determines whether there is a fear of an invading object. When there is a fear of an invading object, the determination in step S201 is repeated. When there is no fear of invading object, the flow proceeds to the process of step S202.

In step S202, the weather information acquiring section 220 determines whether there is a fear of worsening of weather. When there is a fear of worsening of weather, the flow returns to the process of step S201. When there is no fear of worsening of weather, the flow proceeds to the process of step S203 of FIG. 4. The worsening of weather refers to a situation such as raining or snowing where the interior of the automated driving vehicle gets wet if the window is open.

Figure 4:
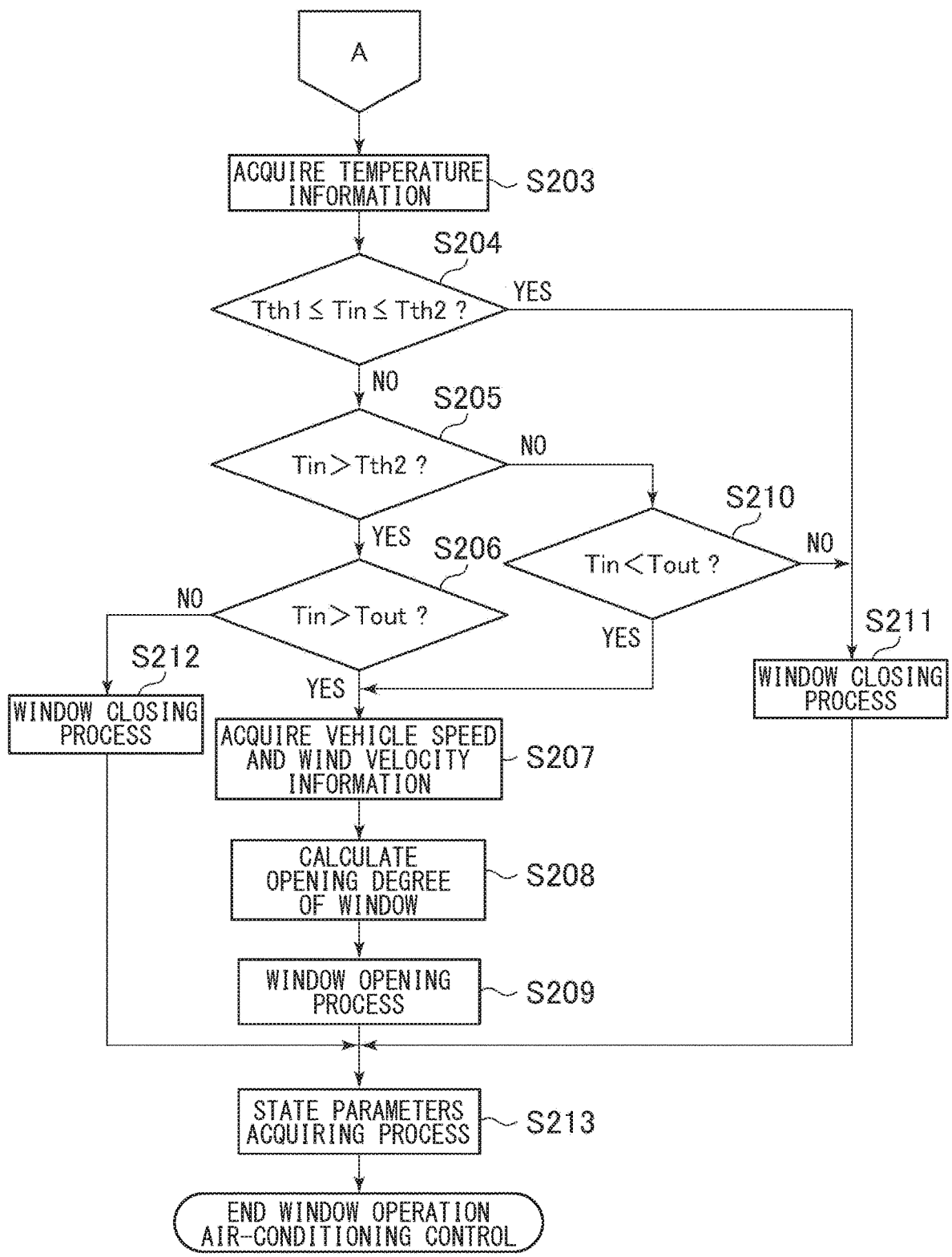
FIG. 4 is a flowchart for illustrating a processing of the air-conditioning control ECU of the first embodiment.

In step S203 of FIG. 4, the inside cabin temperature detecting section 215 acquires inside cabin temperature Tin, and the outside cabin temperature detecting section 216 acquires outside cabin temperature Tout.

In step S204 following step S203, the window operation controlling section 214 determines whether the inside cabin temperature Tin falls within the proper temperature range. More specifically, whether the inside cabin temperature Tin is a proper temperature lower limit threshold Tth1 or more, or whether the inside cabin temperature Tin is a proper temperature upper limit threshold Tth2 or less is determined. When the proper temperature range is from 22° C. to 28° C., the proper temperature lower limit threshold Tth1 is 22° C., and the proper temperature upper limit threshold Tth2 is 28° C. When the inside cabin temperature Tin falls within the proper temperature range, the flow proceeds to the process of step S210. When the inside cabin temperature Tin does not fall within the proper temperature range, the flow proceeds to the process of step S205.

In step S205, the window operation controlling section 214 determines whether the inside cabin temperature Tin is higher than the proper temperature upper limit threshold Tth2. When the inside cabin temperature Tin is higher than the proper temperature upper limit threshold Tth2, it is determined that the cabin is in a high temperature state in which the inside cabin temperature Tin leans to a temperature higher than the proper temperature range, and the flow proceeds to the process of step S206. When the inside cabin temperature Tin is lower than the proper temperature upper limit threshold Tth2, it is determined that the cabin is in a low temperature state in which the inside cabin temperature Tin leans to a temperature lower than the proper temperature range, in combination with the determination result in step S204, and the flow proceeds to the process of step S210.

In step S206, the window operation controlling section 214 determines whether the inside cabin temperature Tin is higher than the outside cabin temperature Tout. When the inside cabin temperature Tin is higher than the outside cabin temperature Tout, the inside cabin temperature Tin approximates the proper temperature range by opening the window, and the flow proceeds to the process of step S207. When the inside cabin temperature Tin is not higher than the outside cabin temperature Tout, the flow proceeds to the process of step S212.

In step S207, the window operation controlling section 214 acquires vehicle speed information and/or wind velocity information. In step S208 following step S207, the window operation controlling section 214 calculates the opening amount of the window while reflecting the vehicle speed information and/or the wind velocity information. In step S209 following step S208, the window operation controlling section 214 executes a window opening process. In execution of the window opening process, the window operation controlling section 214 may promote air circulation inside the cabin and promote exchanging of air between inside and outside the cabin by driving the air blower 251.

In step S210, the window operation controlling section 214 determines whether the inside cabin temperature Tin is lower than the outside cabin temperature Tout. When the inside cabin temperature Tin is lower than the outside cabin temperature Tout, the inside cabin temperature Tin approximates the proper temperature range by opening the window, and the flow proceeds to the process of step S207. When the inside cabin temperature Tin is not lower than the outside cabin temperature Tout, the flow proceeds to the process of step S211.

When the determination result in step S206 is "NO", the cabin is in a high temperature state in which the inside cabin temperature Tin is not higher than the outside cabin temperature Tout, and the inside cabin temperature Tin leans to a temperature higher than the proper temperature range, so that it is impossible to make the inside cabin temperature approximate the proper temperature range even by opening the window. Therefore, in step S212, the window operation controlling section 214 executes a window closing process.

When the determination result in step S210 is "NO", the cabin is in a low temperature state in which the inside cabin temperature Tin is not lower than the outside cabin temperature Tout, and the inside cabin temperature Tin leans to a temperature lower than the proper temperature range, so that it is impossible to make the inside cabin temperature approximate the proper temperature range even by opening the window. Therefore, in step S211, the window operation controlling section 214 executes a window closing process.

In step S213 following step S209, step S211, and step S212, the window operation controlling section 214 acquires an opening or closing state of the window as state parameters, and executes a process of storing in memory, and ends the window operation air-conditioning control.

Returning to FIG. 2, in step S106 following step S105, a window operation air-conditioning end control is executed. The window operation air-conditioning end control is described with reference to FIG. 5.

Figure 5:
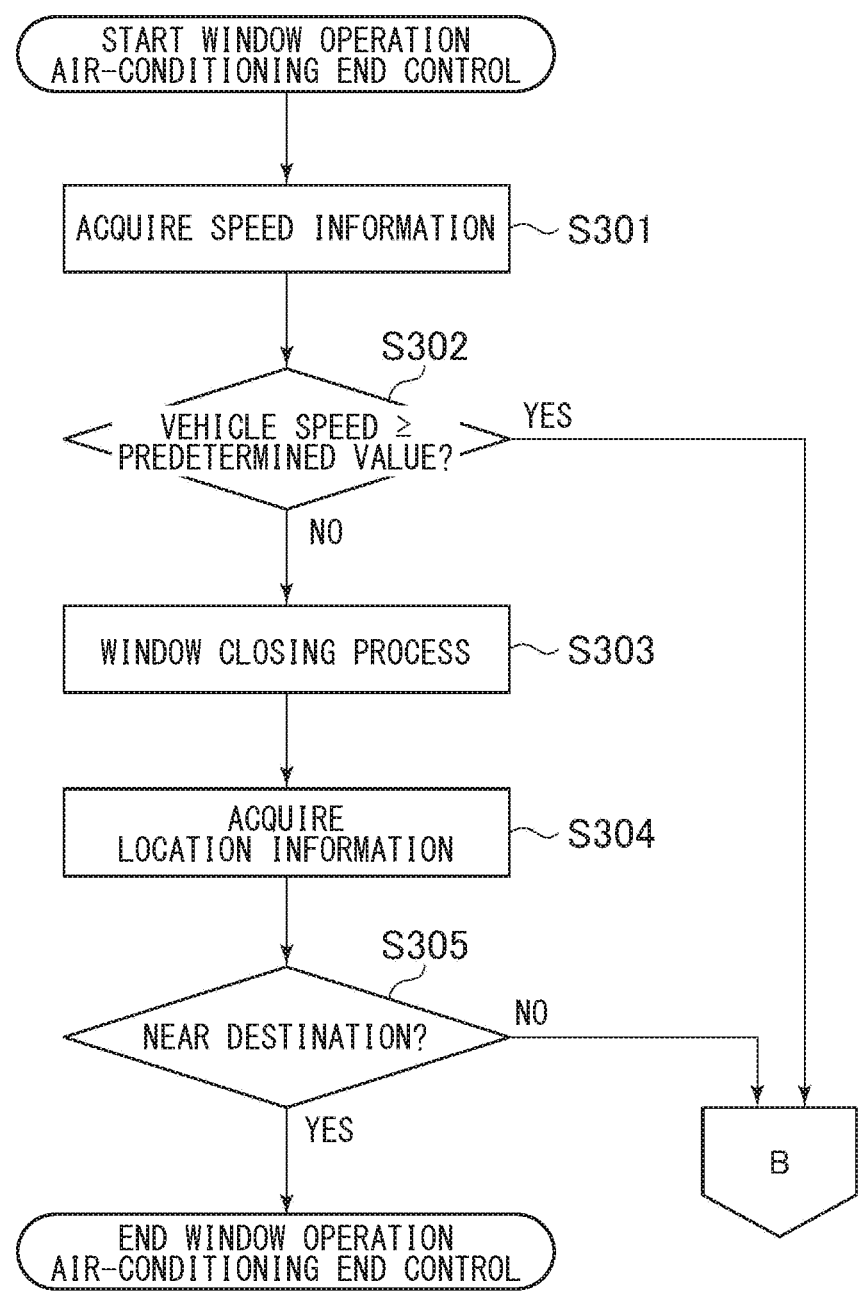
FIG. 5 is a flowchart for illustrating a processing of the air-conditioning control ECU of the first embodiment.

In step S301 of FIG. 5, the travel determining section 213 acquires vehicle speed information. In step S302 following step S301, the travel determining section 213 determines whether the vehicle speed is a predetermined threshold speed or more. When the vehicle speed is a predetermined threshold speed or more, it is determined that the automated driving vehicle is in an unmanned traveling state, and the flow returns to step S105 of FIG. 2, and a window operation air-conditioning control is executed. When the vehicle speed is not a predetermined threshold speed or more, it is determined that the automated driving vehicle is not in an unmanned traveling state but the vehicle is in the course of stopping or already stopped, and the flow proceeds to the process of step S303. In step S303, the window operation controlling section 214 executes a window closing process.

In step S304 following step S303, the window operation controlling section 214 acquires location information of the automated driving vehicle. In step S305 following step S304, the window operation controlling section 214 determines whether the automated driving vehicle is situated around the destination. When the automated driving vehicle has not reached the periphery of the destination, the flow returns to step S105 of FIG. 2, and the window operation air-conditioning control is executed. When the automated driving vehicle has reached the periphery of the destination, the window operation air-conditioning end control ends.

When the window operation air-conditioning control as described above is executed, the inside cabin temperature changes to fall within the proper temperature range until the automated driving vehicle moves to the place where a person intends to ride thereon. One example of temperature change in the cabin is described with reference to FIG. 6 (A) indicates power consumption of the vehicle air-conditioning apparatus, and FIG. 6 (B) indicates inside cabin temperature.

The window operation air-conditioning control is started at time t1, and the window operation air-conditioning control continues until a person rides on at time t2. The inside cabin temperature gradually lowers from time t1, and approximates the proper temperature upper limit threshold Tth2 at time t2. When a person rides on at time t2, the vehicle air-conditioning apparatus 25 using the refrigerating cycle operates, and starts air-conditioning. Therefore, the power consumption of the vehicle air-conditioning apparatus 25 rises from time t2. Since the vehicle air-conditioning apparatus 25 operates after the inside cabin temperature has approximated the proper temperature range, the power consumption of the vehicle air-conditioning apparatus 25 is reduced compared with the case where the inside cabin temperature is high.

Figure 7:
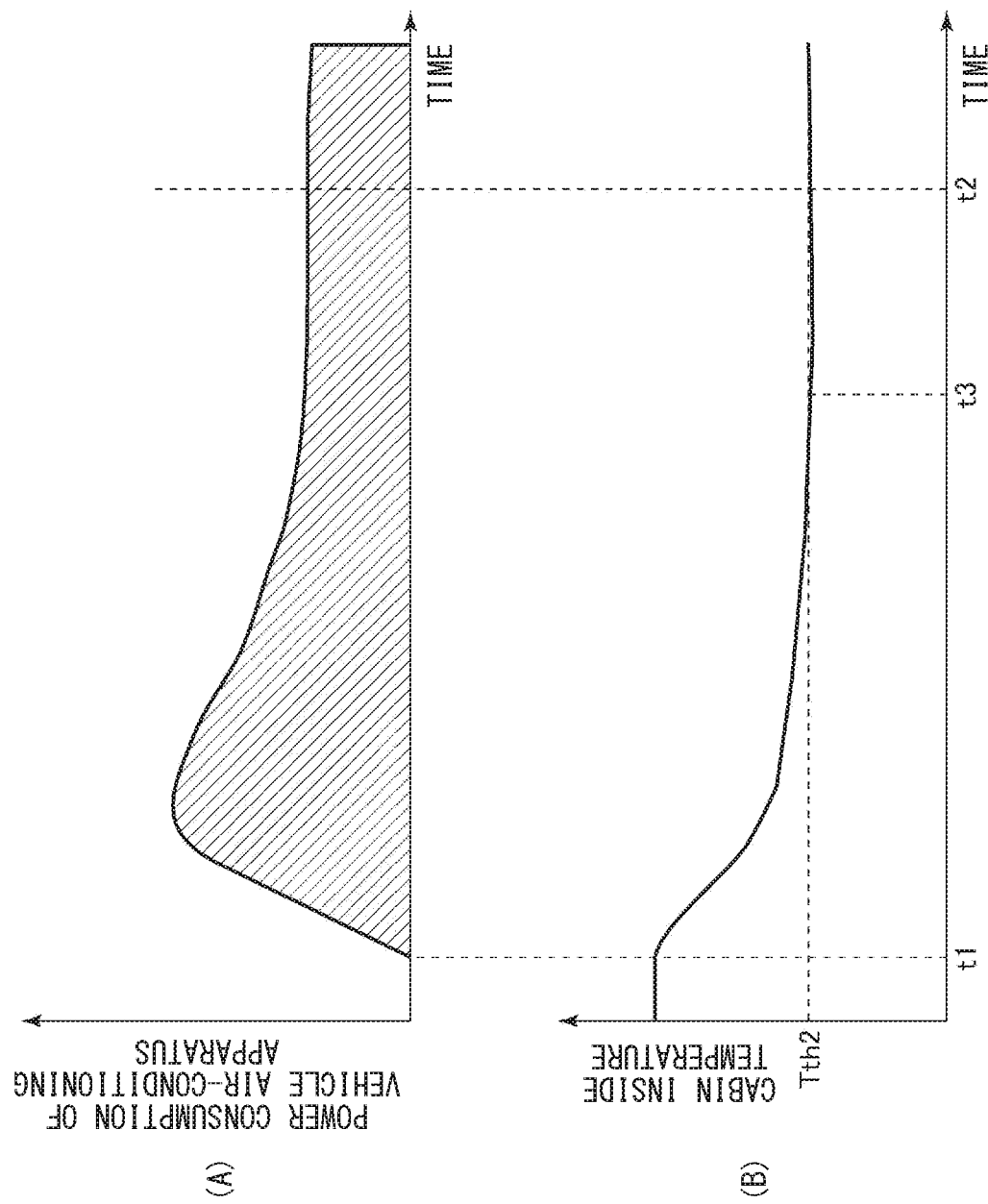
FIG. 7 is a view for illustrating power consumption when the air-conditioning control ECU of the first embodiment is not used.

For comparison, one example of temperature change inside the cabin and power consumption of the vehicle air-conditioning apparatus when the window operation air-conditioning control is not executed is described with reference to FIG. 7. FIG. 7 (A) indicates power consumption of the vehicle air-conditioning apparatus, and FIG. 7 (B) indicates inside cabin temperature.

The air-conditioning control using the vehicle air-conditioning apparatus is started at time t1, and the window operation air-conditioning control is continued until a person rides on at time t2. In comparison with the window operation air-conditioning control, the inside cabin temperature more sharply drops from time t1, and reaches the proper temperature upper limit threshold Tth2 at time t3 that is earlier than time t2. Since the proper temperature range has been already reached at time t2, the riding person feels more comfortable. On the other hand, the load is large because the vehicle air-conditioning apparatus is operated in a state where the inside cabin temperature is high, and thus the power consumption of the vehicle air-conditioning apparatus is increased as compared with the case described with reference to FIG. 6.

Figure 8:
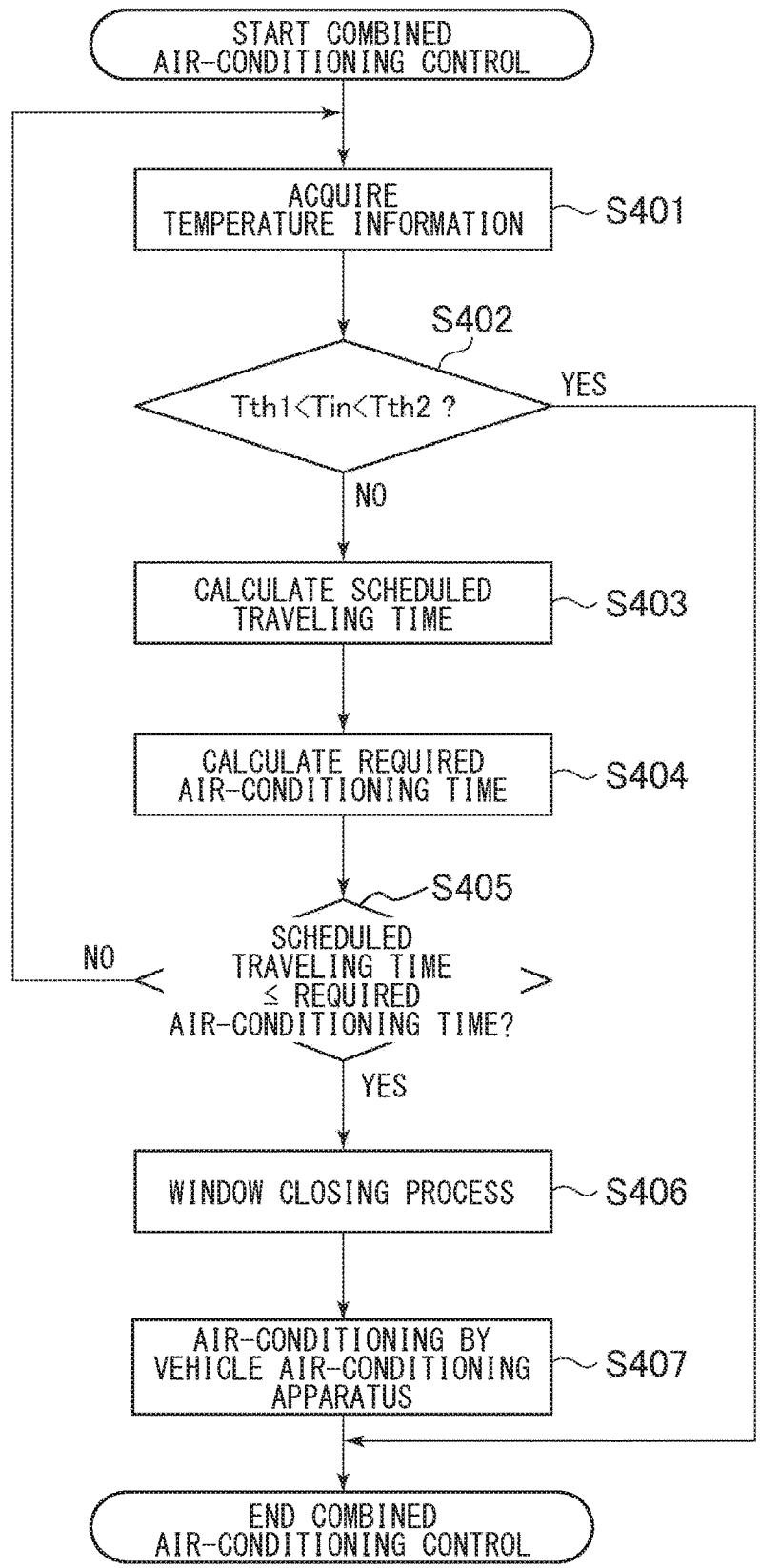
FIG. 8 is a view for illustrating another example in which power consumption is suppressed by control by the air-conditioning control ECU of the first embodiment.
Figure 9:
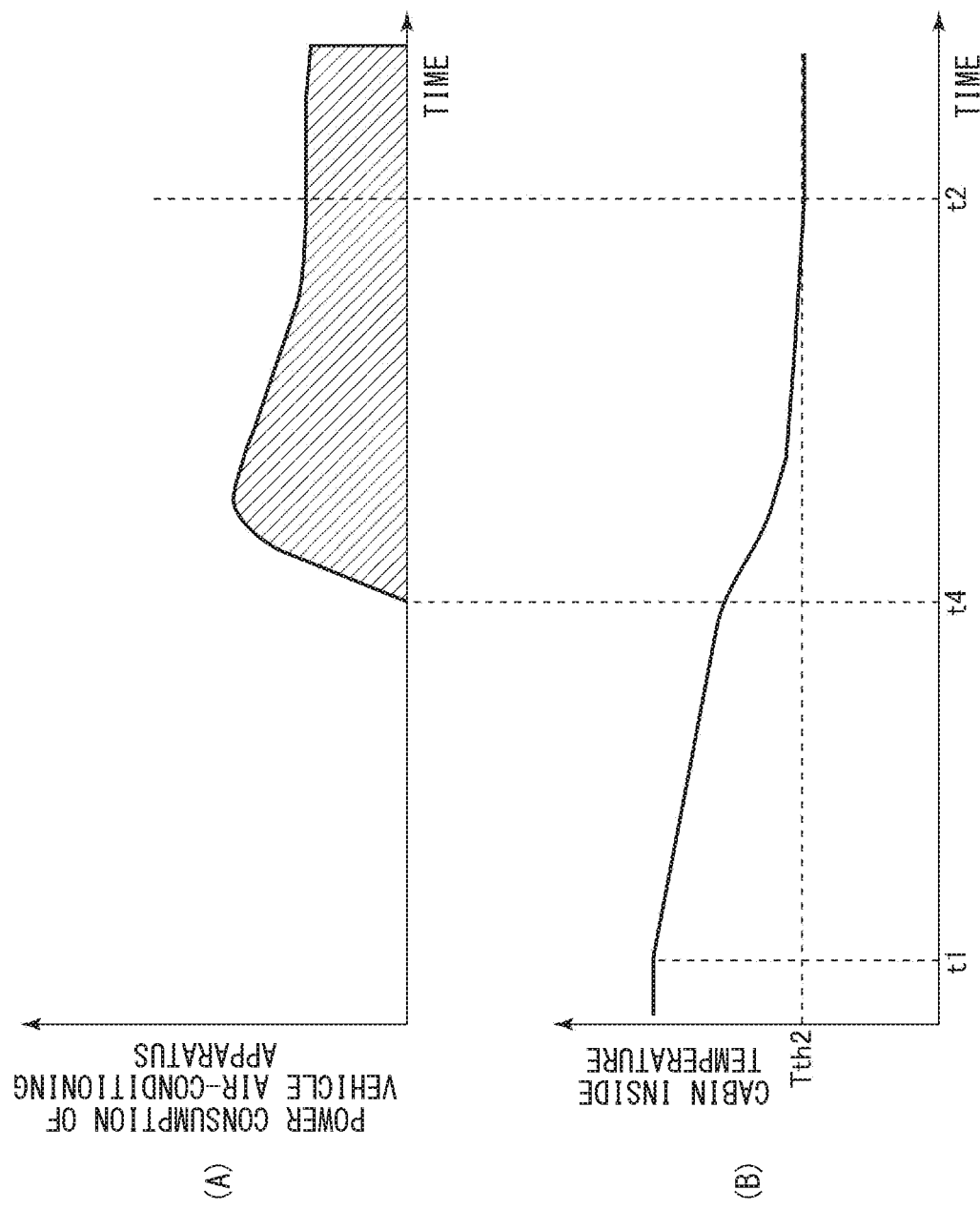
FIG. 9 is a flowchart for illustrating a processing of the air-conditioning control ECU executed for achieving the state shown in FIG. 8.

With reference to FIG. 8 and FIG. 9, description is made for the example that the temperature inside the cabin reaches a proper temperature when a person rides on the vehicle although the power consumption of the vehicle air-conditioning apparatus is not increased as is the case described with reference to FIG. 7.

Figure 2:
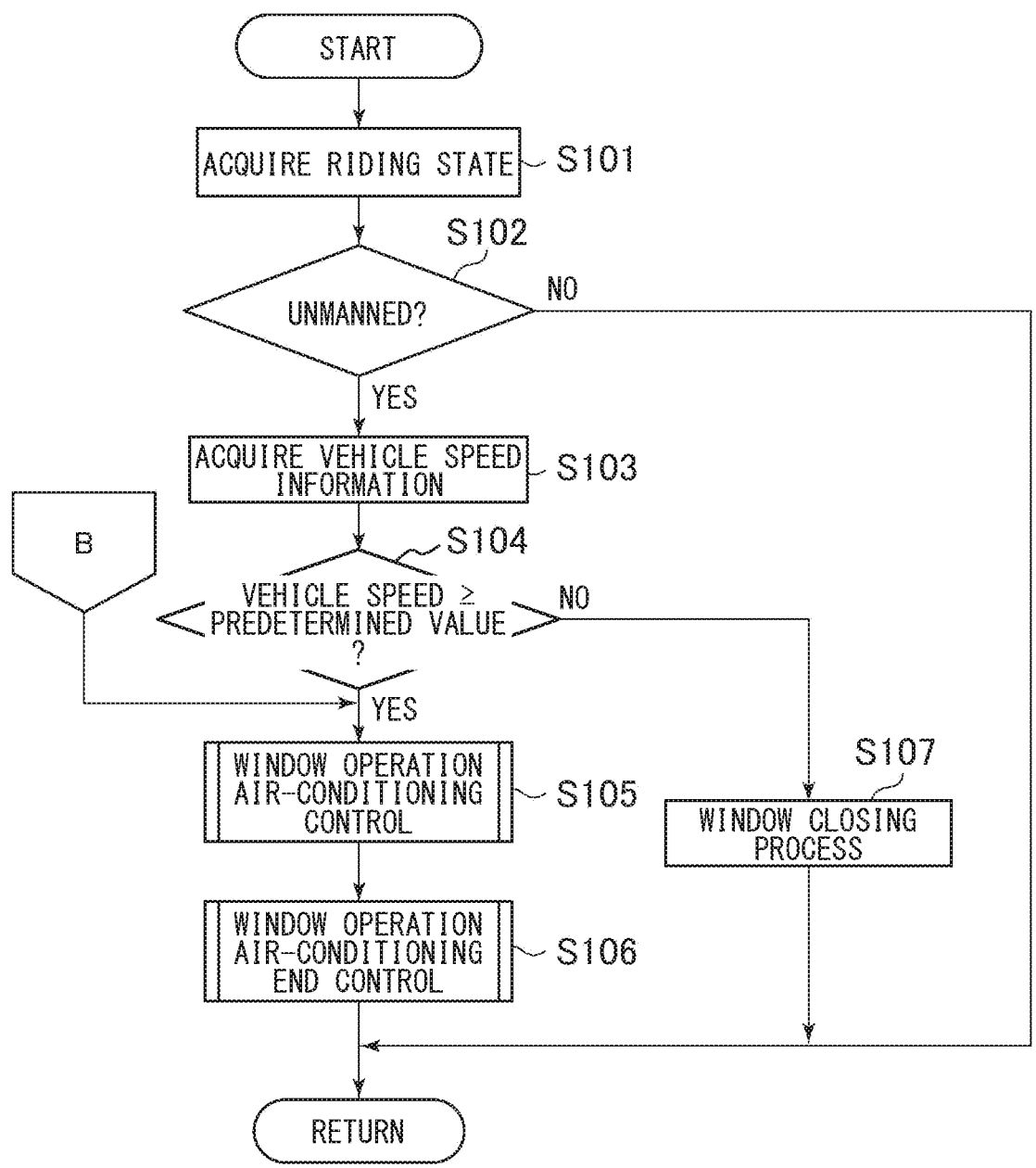
FIG. 2 is a flowchart for illustrating a processing of the air-conditioning control ECU of the first embodiment.

FIG. 8 is a flowchart showing the procedure of performing combined air-conditioning control in which the air-conditioning control ECU 21 uses a combination of window operation air-conditioning control and air-conditioning control using the vehicle air-conditioning apparatus 25. The combined air-conditioning control shown in FIG. 8 is the control with which the window operation air-conditioning control of step S105 and the window operation air-conditioning end control of step S106 in FIG. 2 are executed in parallel. FIG. 9 (A) indicates power consumption of the vehicle air-conditioning apparatus 25, and FIG. 9 (B) indicates inside cabin temperature.

In step S401 of FIG. 8, the inside cabin temperature detecting section 215 acquires inside cabin temperature Tin, and the outside cabin temperature detecting section 216 acquires outside cabin temperature Tout.

In step S402 following step S401, the window operation controlling section 214 determines whether the inside cabin temperature Tin falls within the proper temperature range. More specifically, whether the inside cabin temperature Tin is higher than a proper temperature lower limit threshold Tth1 and lower than a proper temperature upper limit threshold Tth2 is determined. When the proper temperature range is from 22° C. to 28° C., the proper temperature lower limit threshold Tth1 is 22° C., and the proper temperature upper limit threshold Tth2 is 28° C. When the inside cabin temperature Tin falls within the proper temperature range, the combined air-conditioning control is ended, and the window operation air-conditioning control or the window operation air-conditioning end control is executed. When the inside cabin temperature Tin does not fall within the proper temperature range, the flow proceeds to the process of step S403.

In step S403, the remaining travel calculating section 218 acquires a scheduled traveling time. The scheduled traveling time is determined on the basis of the current location of the automated driving vehicle and a location where a person is scheduled to get into, while taking peripheral road conditions and traveling speeds of the automated driving vehicle into account.

In step S404 following step S403, the air-conditioning controlling section 211 calculates a time required to make the inside cabin temperature Tin fall within the proper temperature range by the vehicle air-conditioning apparatus utilizing the refrigerating cycle system including the air blower 251 and the compressor 252, as a required air-conditioning time.

In step S405 following step S404, the window operation controlling section 214 determines whether the scheduled traveling time is the required air-conditioning time or less. When the scheduled traveling time is the required air-conditioning time or less, the flow proceeds to the process of step S406. When the scheduled traveling time is not the required air-conditioning time or less, the flow returns to the process of step S401.

In step S406, the window operation controlling section 214 executes a process of closing the window. In step S407 following step S406, the air-conditioning controlling section 211 executes air-conditioning by the vehicle air-conditioning apparatus 25 using the refrigerating cycle including the air blower 251 and the compressor 252.

When the combined air-conditioning control that has been described with reference to FIG. 8 is executed, in FIG. 9, the window operation air-conditioning control is executed from time t1 to time t4, and the air-conditioning control using the vehicle air-conditioning apparatus 25 is executed from time t4 to time t2. In FIG. 9, time t4 is a timing at which the remaining scheduled traveling time falls to be the required air-conditioning time or less.

When FIG. 9 is compared with FIG. 7, the power consumption of the vehicle air-conditioning apparatus 25 is reduced. More specifically, in FIG. 9, since the window operation air-conditioning control is executed and the vehicle air-conditioning apparatus is stopped from time t1 to time t4, the power consumption of the vehicle air-conditioning apparatus 25 is zero. Although the air-conditioning control using the vehicle air-conditioning apparatus 25 is executed from time t4, the inside cabin temperature is lowered by the window operation air-conditioning control, so that the load decreases and the power consumption decreases.

Figure 6:
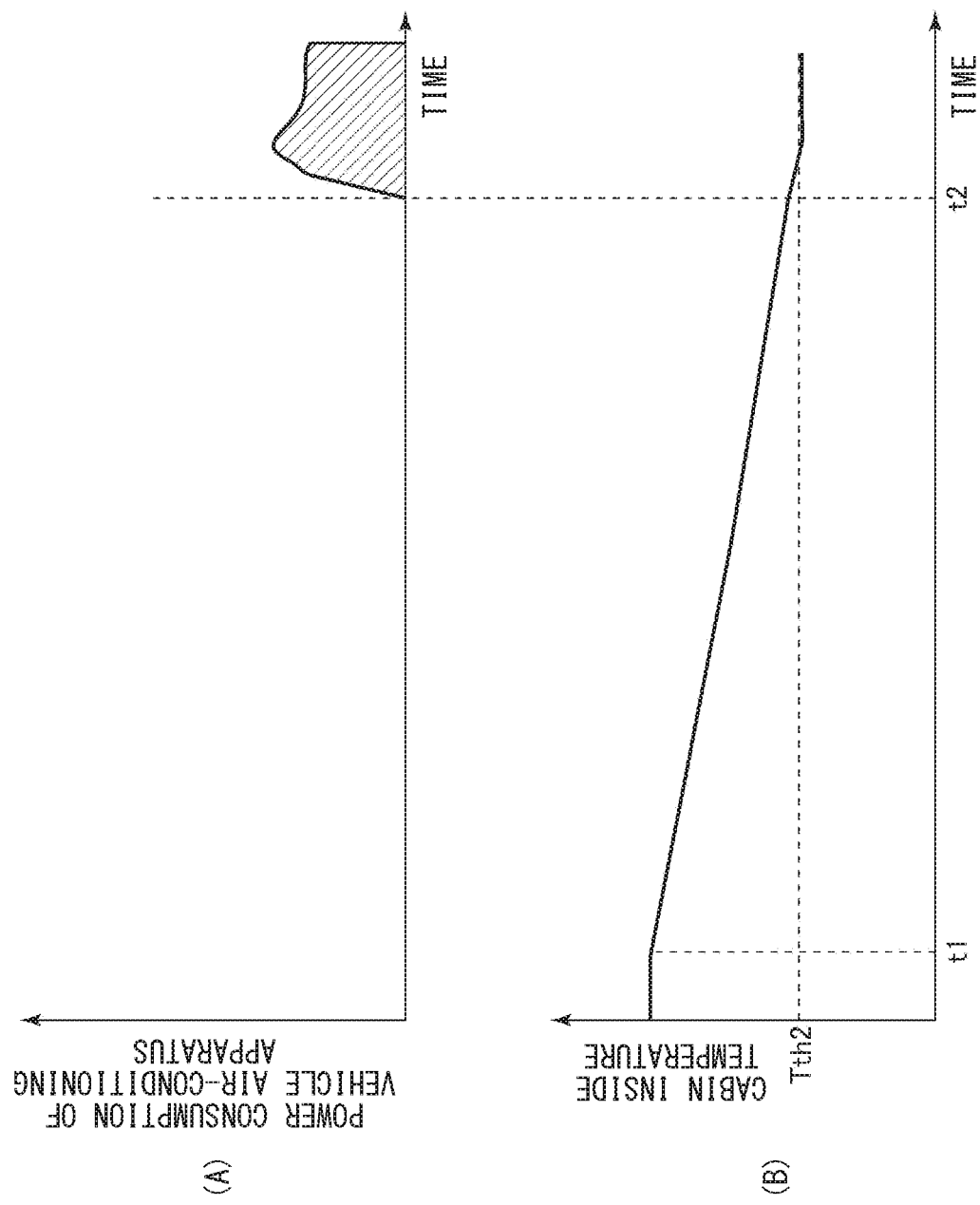
FIG. 6 is a view for illustrating the state in which power consumption is suppressed by control by the air-conditioning control ECU of the first embodiment.

When FIG. 6 is compared with FIG. 9, although the power consumption of the vehicle air-conditioning apparatus 25 from time t4 to time t2 in FIG. 9 increases, the inside cabin temperature at time t2 has already fallen within the proper temperature range.

In the present embodiment, the air-conditioning control ECU 21 include, as functional blocks, the air-conditioning controlling section 211, the occupant determining section 212, the travel determining section 213, the window operation controlling section 214, the inside cabin temperature detecting section 215, the outside cabin temperature detecting section 216, the wind velocity detecting section 217, the remaining travel calculating section 218, the invading object determining section 219, and the weather information acquiring section 220. However, not all of the functional constituents need to be provided in the air-conditioning control ECU 21, but part or all of the functional constituents may be provided in the vehicle control ECU 101 or other ECU as long as the window actuator 30 and the vehicle air-conditioning apparatus 25 can be driven on the basis of the information processing as described above.

Correspondence between the present embodiment described above and the present disclosure is described. The air-conditioning control ECU 21 of the present embodiment corresponds to the air-conditioning control apparatus of the present disclosure. The air-conditioning controlling section 211 of the present embodiment corresponds to the refrigerating cycle air-conditioning control section.

Second Embodiment

A vehicle air-conditioning apparatus 1A is mounted in a vehicle. The vehicle air-conditioning apparatus 1A provides air-cooling, heating and/or ventilation inside the cabin. The vehicle air-conditioning apparatus 1A performs air-cooling and heating by sending temperature-controlled air-conditioning wind into the cabin. The vehicle air-conditioning apparatus 1A performs ventilation by discharging air inside the cabin out of the cabin and taking air outside the cabin into the cabin.

Driving of the vehicle is controlled by a vehicle control apparatus (hereinafter, indicated by vehicle ECU) 10A. In other words, the vehicle ECU 10A controls traveling of the vehicle, and controls a cooling system required for traveling of the vehicle.

Figure 10:
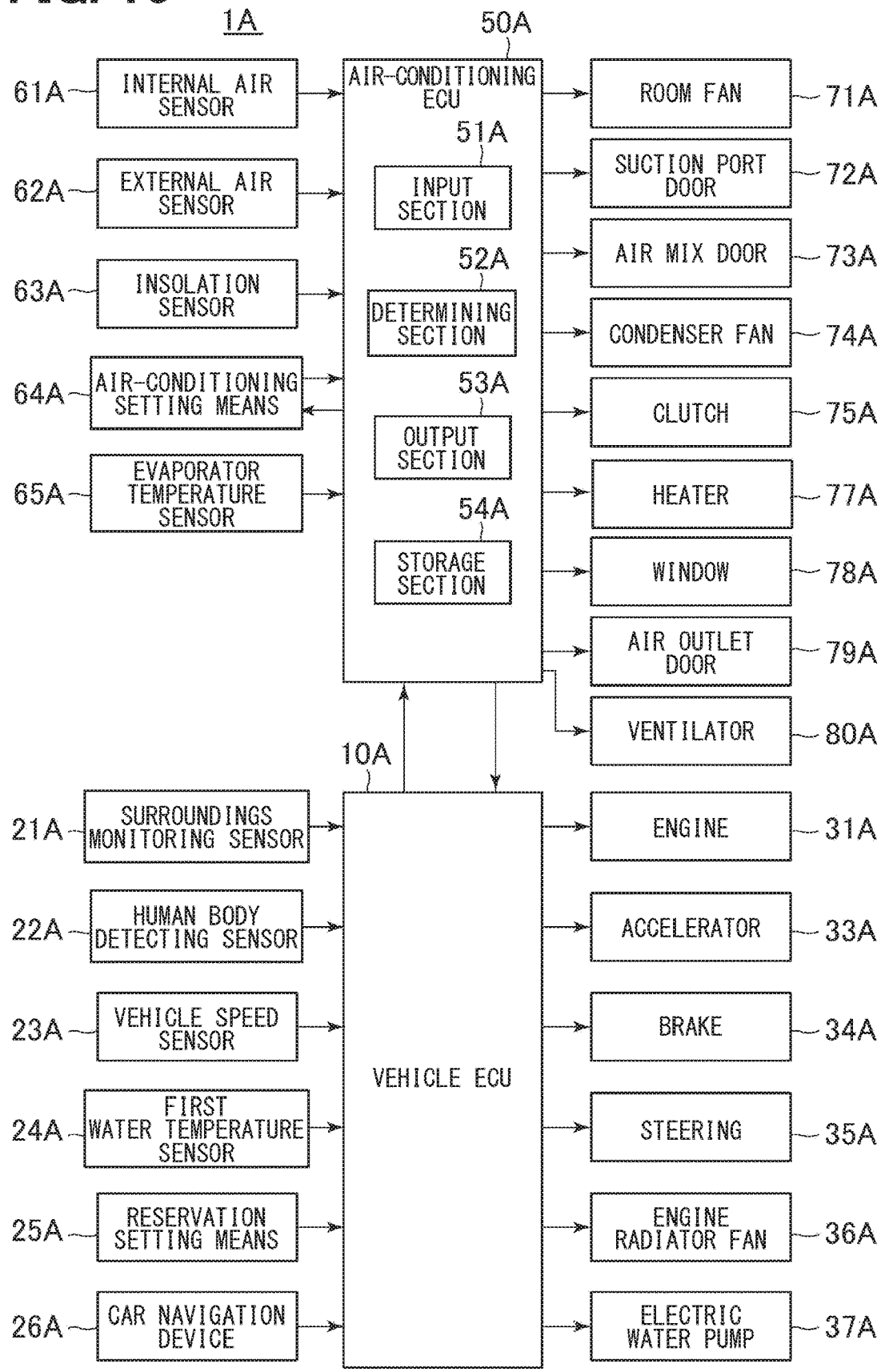
FIG. 10 is a block diagram of a vehicle air-conditioning apparatus which is a second embodiment.

In FIG. 10, to the vehicle ECU 10A, a surroundings monitoring sensor 21A, a human body detecting sensor 22A, a vehicle speed sensor 23A, a first water temperature sensor 24A, a reservation setting means 25A, and a car navigation device 26A are connected. To the vehicle ECU 10A, a signal which is a detection result from each of connected components is input.

The surroundings monitoring sensor 21A is a sensor for acquiring data of the external environment in the surroundings of the vehicle. The surroundings monitoring sensor 21A is a camera provided in the frontward direction of the vehicle, namely the traveling direction of the vehicle. The surroundings monitoring sensor 21A may be a radar that detects the presence or absence of an obstacle in front of the vehicle. As the surroundings monitoring sensor 21A1, both of a camera and a radar may be used. The vehicle ECU 10A acquires data required for unmanned travel control of the vehicle such as external environmental data of the surroundings of the vehicle using the surroundings monitoring sensor 21A1.

The human body detecting sensor 22A is an unmanned determining means that determines whether the interior of the cabin is in an unmanned state or in a manned state. The human body detecting sensor 22A is a seating sensor that is disposed on a seat and determines whether the vehicle is in a manned state in response to the load applied by seating of an occupant. The seating sensor is individually provided for each of a plurality of seats in the vehicle, and detects on which seat an occupant sits. The human body detecting sensor 22A is not limited to a seating sensor. The human body detecting sensor 22A may be a seat belt sensor that detects wearing of the seat belt. The human body detecting sensor 22A may be an infrared sensor that detects an infrared ray radiated from a human body. The infrared sensor is capable of determining whether the cabin is in a manned state even when an occupant does not sit on a seat.

The vehicle speed sensor 23A is a sensor that detects a traveling speed of the vehicle. The vehicle speed sensor 23A is disposed on a wheel of the vehicle, and detects the rotational speed of the wheel. Thus, the vehicle speed which is the traveling speed of the vehicle is calculated.

The first water temperature sensor 24A is a temperature sensor disposed in the vicinity of an outlet of an engine 31A in a circulating path of the engine cooling water. The first water temperature sensor 24A detects the temperature of the engine cooling water directly after the temperature rises by heat exchange with the engine 31A.

The reservation setting means 25A is an operation means with which a user sets a reservation of the vehicle. The vehicle ECU 10A controls automatic driving of the vehicle to a designated place at a time that is preliminarily designated by reservation setting. The reservation setting means 25A is a communication terminal outside the cabin such as a smartphone or a PC. The reservation setting means 25A may be an operation terminal provided inside the cabin. In this case, an occupant on the vehicle makes reservation setting by inputting information about the next scheduled riding time and scheduled riding place. In the reservation setting means 25A, information such as a target temperature inside the cabin, and the presence or absence of music in the cabin can also be set.

The car navigation device 26A determines an optimum traveling route and calculates an expected required time using information about the set destination and the information about the current location of the vehicle acquired by GPS. The required time to the destination is calculated by dividing distance information that is calculated by multiplying the direct distance from the current location to the destination by a detour coefficient, by speed information (for example, a speed of 40 km an hour). In calculation of the required time, traffic jam information may be acquired, and correction of extending the required time, for example, may be made when a traffic jam occurs.

To the vehicle ECU 10A, the engine 31A, an accelerator 33A, a brake 34A, and a steering 35A that are devices required for traveling are connected. To the vehicle ECU 10A, an engine radiator fan 36A which is a cooling device for cooling the devices required for traveling, and an electric water pump 37A are connected. From the vehicle ECU 10A, a signal that controls each of the connected components is output.

The engine 31A is vehicle power for the vehicle to travel. The engine 31A is an internal combustion engine that obtains power by combustion gas generated when fuel is burnt. The power generated by the engine 31A is also used as power of the compressor that compresses a coolant and makes the coolant circulate in the heat exchanger for air-cooling in the air-conditioning apparatus.

The accelerator 33A is a device that accelerates the vehicle. The brake 34A is a device that decelerates the vehicle. The vehicle ECU 10A controls the vehicle speed by accelerating or decelerating the vehicle by controlling the accelerator 33A and the brake 34A.

The steering 35A is a device that controls the orientation of tires. The vehicle ECU 10A controls the traveling direction of the vehicle by controlling the steering 35A.

The engine radiator fan 36A is an air blower that sends air to the engine radiator which is a radiator in which the engine cooling water circulates. The engine radiator fan 36A is provided in front of the engine radiator A disposed in a front part of the vehicle. In other words, the engine radiator fan 36A is disposed facing the engine radiator A. The engine radiator fan 36A sends air from the front part toward the rear part of the vehicle. In other words, the air is sent in the same direction as the direction of the traveling wind received by the traveling vehicle.

The vehicle ECU 10A is connected to the electric water pump 37A. The electric water pump 37A is a pump driven as power for circulating the engine cooling water that cools the engine 31A which is vehicle power. The electric water pump 37A is controlled by the vehicle ECU 10A regarding on/off of its driving and the intensity of the output.

Besides the above, the vehicle ECU 10A controls various devices used for traveling including a transmission, a headlight, a winker, and a wiper. The vehicle ECU 10A is connected to an air-conditioning control apparatus (hereinafter, indicated by air-conditioning ECU) 50A that performs control regarding an air-conditioning operation, in a mutually communicable manner.

The air-conditioning ECU 50A includes a processor as defined by functional blocks of at least an input section 51A, a determination section 52A, and an output section 53A. The air-conditioning ECU 50A also includes a storage section 54A. The input section 51A receives a signal output from each of connected components such as a sensor. The determination section 52A performs an operation based on the information input into the input section 51A and determines the air-conditioning control content. Since the determination section 52A is capable of determining a riding state of an occupant in the vehicle, it corresponds to an occupant determining section of the present disclosure. The output section 53A transmits the air-conditioning control content determined in the determination section 52A to each of connected components that are to be controlled. Since the output section 53A transmits and executes an air-conditioning control content on the basis of the determination result of the determination section 52A functioning as an occupant determining section, it corresponds to the air-conditioning controlling section of the present disclosure. The storage section 54A stores information received in the input section 51A or a determination result determined in the determination section 52A.

To the air-conditioning ECU 50A, an internal air sensor 61A, an external air sensor 62A, an insolation sensor 63A, an air-conditioning setting means 64A, and an evaporator temperature sensor 65A are connected. To the air-conditioning ECU 50A, a signal which is a detection result from each of connected components is input.

The internal air sensor 61A is a temperature sensor that measures the temperature inside the cabin. The internal air sensor 61A is disposed in an instrument panel inside the cabin. The external air sensor 62A is a temperature sensor that measures the temperature outside the cabin. The external air sensor 62A is disposed on the back side of the front bumper where the sensor is less likely to be influenced by the hot air inside the engine room. The insolation sensor 63A is a sensor that measures the insolation intensity of the sunlight applied to the vehicle. The insolation sensor 63A is disposed on the top face of the dashboard.

The air-conditioning setting means 64A is an operation panel on which an occupant can set a target temperature inside the cabin, the strength of the blowing air flow and the like. The air-conditioning setting means 64A is disposed inside the cabin. The air-conditioning setting means 64A is operable by an occupant during traveling. The air-conditioning setting means 64A is not limited to an operation panel disposed inside the cabin. The air-conditioning setting means 64A may be a communication terminal outside the cabin such as a smartphone or a PC. The air-conditioning setting means 64A may be died by the same terminal as the reservation setting means 25A that allows both the air-conditioning setting and the reservation setting.

The air-conditioning ECU 50A calculates a target air outlet temperature which is a target temperature in the vicinity of the air outlet of the air-conditioning wind, from the measurement results of the internal air sensor 61A, the external air sensor 62A, and the insolation sensor 63A, and information of the target temperature inside the cabin input by the air-conditioning setting means 64A and so on. The air-conditioning ECU 50A performs an air-conditioning operation on the basis of the calculated target air outlet temperature.

The evaporator temperature sensor 65A is a temperature sensor that measures the temperature of the evaporator which is a heat exchanger for air-cooling. The evaporator temperature sensor 65A is disposed in the vicinity of outlet piping of the evaporator. The air-conditioning ECU 50A controls an air-cooling operation on the basis of the temperature of the evaporator measured in the evaporator temperature sensor 65A.

To the air-conditioning ECU 50A, a room fan 71A, a suction port door 72A, an air mix door 73A, a condenser fan 74A, a clutch 75A, a heater 77A, a window 78A, an air outlet door 79A, and a ventilator 80A are connected. From the air-conditioning ECU 50A, a signal that controls each of connected components is output.

The room fan 71A is a fan that sends air-conditioning wind inside the cabin. The room fan 71A sends air to the evaporator which is a heat exchanger for air-cooling, and to a heater core which is a heat exchanger for heating. The air after heat exchange with the evaporator and the heater core is blown to the cabin through the air outlet as air-conditioning wind. The air-conditioning ECU 50A controls air-conditioning by sending air-conditioning wind inside the cabin by controlling the room fan 71A.

The suction port door 72A is a door member that closes either one of two suction ports, that is, an internal air suction port and an external air suction port. The suction port door 72A is a rotary door that rotates about the rotation axis to adjust the aperture. When the external air suction port is closed, the air-conditioning wind is circulated inside the cabin. The mode circulating the wind inside the cabin is an internal air mode. When the internal air suction port is closed, the wind taken in from outside the cabin is sent inside the cabin. The mode taking the wind inside the cabin from outside the cabin is an external air mode.

The air mix door 73A is a door member that controls the ratio at which the wind having passed through the evaporator which is a heat exchanger for air-cooling, and the heater core which is a heat exchanger for heating are heat-exchanged. The air mix door 73A is disposed in front of the heater core. The air mix door 73A is a plate door. When the air mix door 73A is closed to cover the entire front face of the heater core, the cool air-conditioning wind that has been heat-exchanged only with the evaporator is sent inside the cabin. When the air mix door 73A is opened apart from the front face of the heater core, the air-conditioning wind that has been heat-exchanged both with the evaporator and the heater core is sent inside the cabin.

The condenser fan 74A is an air blower that sends air to the condenser which is a heat radiator constituting a part of a refrigerating cycle for air-cooling. The condenser fan 74A is disposed in front of the condenser disposed in the front part of the vehicle. In other words, the condenser fan 74A is disposed facing the condenser. The condenser fan 74A sends air rearward from the front part of the vehicle. In other words, the air is sent in the same direction as the direction of the traveling wind received by the traveling vehicle. The condenser fan 74A and the engine radiator fan 36A are disposed adjacently to each other.

The clutch 75A is a coupling device that controls coupling between the engine 31A and the compressor constituting the refrigerating cycle for air-cooling. The clutch 75A is a magnet clutch that controls a coupling state and an uncoupling state by presence or absence of the magnetic force. When an air-cooling operation is performed, the clutch 75A is brought into a coupling state. That is, the engine 31A and the compressor are coupled to drive the compressor using the engine 31A as power. In other words, the compressor is an air-conditioning apparatus that performs air conditioning using the engine 31A which is vehicle power as power. Therefore, when an air-cooling operation is performed while the vehicle is parked, it is necessary to drive the engine 31A so as to drive the compressor. On the other hand, when an air-cooling operation is not performed, the clutch 75A is brought into an uncoupling state. That is, the engine 31A is uncoupled from the compressor to make the compressor in an undriven state.

The heater 77A is a heat source for use in heating inside the cabin. The heater 77A is a PTC heater having such a property that the value of the electric resistance varies with a positive factor as the temperature increases. The heater 77A is a heater that is disposed additionally to the heater core, and contributes to heating inside the cabin. The air-conditioning ECU 50A energizes the heater 77A to raise the temperature when heating is necessary. The heater 77A may be a heater that contributes to heating. For example, a seat heater disposed on a seat may be employed.

The window 78A has a ventilation function for taking external air into the cabin. The window 78A is disposed on the upper part of the door that is opened or closed by an occupant to get on or off the vehicle. In a ventilation operation, the air-conditioning ECU 50A opens the window 78A to discharge the internal air outside while taking the external air into the cabin. The air-conditioning ECU 50A closes the window 78A after completion of the ventilation operation.

The air outlet door 79A is a door that is provided in the air outlet through which the air-conditioning wind is blown into the cabin. The air outlet is disposed in a front part inside the cabin. The ventilator 80A is disposed in a rear part of the cabin, and leads the air inside the cabin to the outside of the cabin.

The air-conditioning ECU 50A controls each device so that the air-conditioning wind is blown out at a target air outlet temperature. That is, the air-conditioning ECU 50A controls the number of revolutions of the room fan 71A. The air-conditioning ECU 50A controls switching of the suction port door 72A. The air-conditioning ECU 50A controls the aperture of the air mix door 73A. The air-conditioning ECU 50A controls the number of revolutions of the condenser fan 74A. The air-conditioning ECU 50A controls switching between coupling and uncoupling of the clutch 75A. The air-conditioning ECU 50A controls output of the heater 77A. The air-conditioning ECU 50A controls opening or closing of the window 78A.

Figure 11:
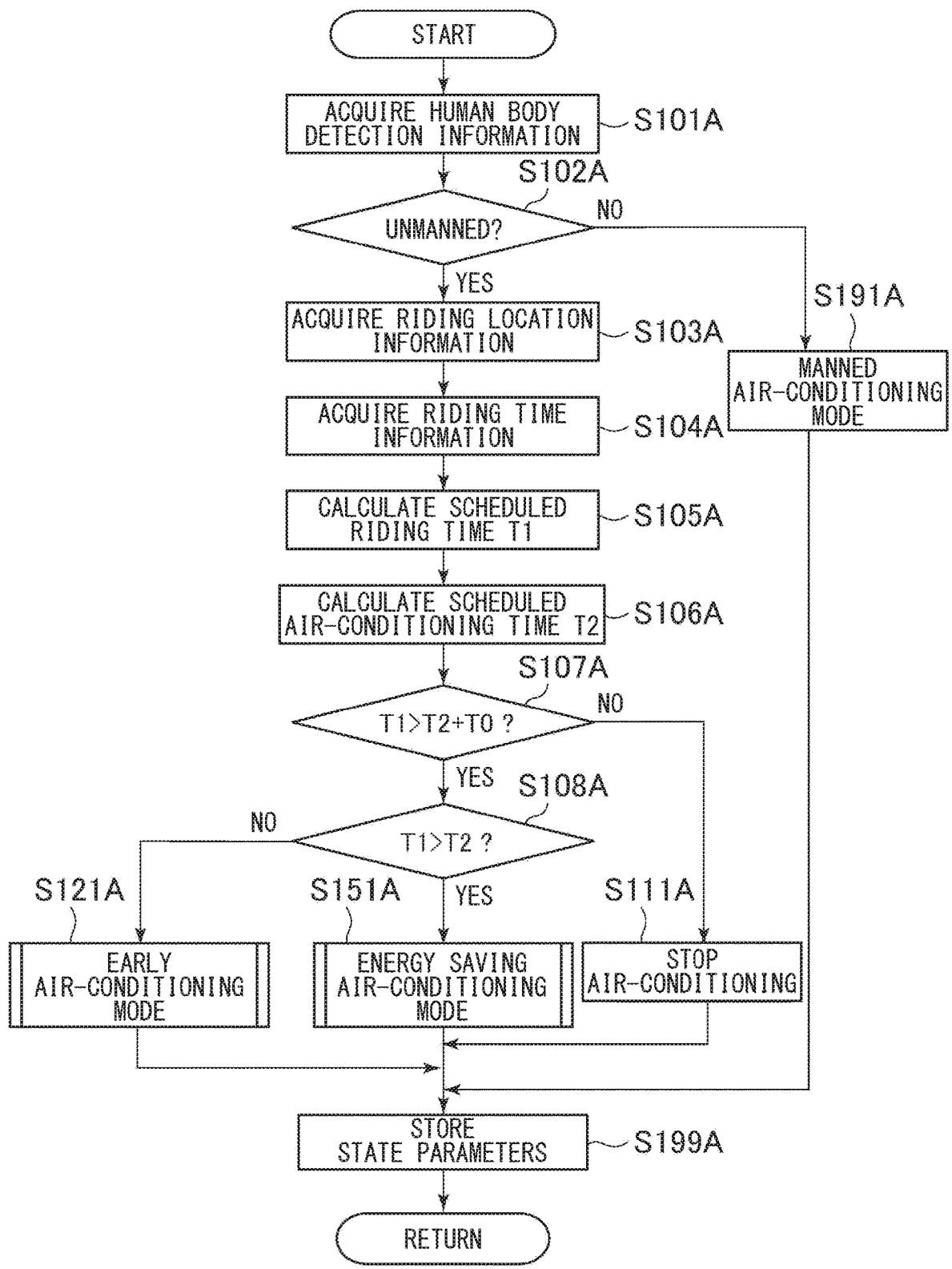
FIG. 11 is a flowchart regarding the control of the vehicle air-conditioning apparatus.

Next, a control processing of the vehicle air-conditioning apparatus 1A (more specifically, the processor of the air-conditioning ECU 50A) is described. In FIG. 11, when the vehicle air-conditioning apparatus 1A starts air-conditioning control, first, presence or absence of a person inside the cabin is detected by using the human body detecting sensor 22A in step S101A. After detection of presence or absence of a person, whether the cabin is in an unmanned state is determined in step S102A. When it is determined that the cabin is in an unmanned state, the flow proceeds to step S103A. On the other hand, when it is determined that the cabin is not in an unmanned state, the flow proceeds to step S191A.

In step S191A, air-conditioning control is performed in a manned air-conditioning mode. That is, air-conditioning is performed so that the occupant currently in the vehicle feels comfortable. In other words, in a manned air-conditioning mode, air-conditioning operation is performed in consideration of factors of comfort such as noises other than the temperature. More specifically, in the manned air-conditioning mode, the operation intensity of the room fan 71A is made lower than the operation intensity of the room fan 71A in the unmanned state. In other words, the upper limit of the number of revolutions of the room fan 71A is made lower than that in the unmanned state. Also, the seat heater is used only in the manned air-conditioning mode. In this case, in the unmanned state, the seat heater is not energized, and after sitting of an occupant, the seat heater is energized to start use. After execution of the air-conditioning operation in the manned air-conditioning mode, the flow proceeds to step S199A while the air-conditioning operation is maintained.

In step S103A, riding location information input by a user using the reservation setting means 25 is acquired. The riding location information is scheduled riding information indicating information about the next expected manned state. The riding location information is information indicating the address where the user intends to ride in the vehicle. The address may not be directly input by the user, but an address may be searched from the input name of a building or a place. A fixed riding location may be preliminarily set as riding location information, and the user may necessarily ride at the predetermined riding place. In this case, the riding location information is not input by the user, but acquired by reading out preliminarily set riding location information. After acquiring the riding location information, the flow proceeds to step S104A.

In step S104A, the riding time information input by the user via the reservation setting means 25A is acquired. The riding time information is scheduled riding information indicating information about the next expected manned state. The riding time information is information indicating the time when the user intends to ride on the vehicle. The information is, for example, a time of 19:30. A time may not be directly input by a user, but a lapse time from the current time may be input. That is, an elapsed time of 30 minutes or the like may be input. Also, the current time rather than a future time may be input by a user. That is, a user who wants to ride as early as possible inputs the current time. In this case, as the riding time information, the current time or a past time is acquired. After acquiring the riding time information, the flow proceeds to step S105A.

The vehicle ECU 10A starts traveling control on the basis of the acquired riding location information and riding time information. That is, the vehicle ECU 10A executes traveling control so that the vehicle reaches the riding location by the riding time. For example, when the current time is 19:00, the riding time information is 19:30, and the riding location information is set at the place requiring 15 minutes to reach from the current location, the vehicle waits at the current location until 19:15. Then, the vehicle starts traveling at 19:15 toward the riding location. The traveling control may be conducted so that the vehicle reaches slightly earlier than the riding time. However, even when the vehicle cannot reach the riding location by the riding time, for example, when the current time is set as the riding time information, the traveling control is conducted so that the vehicle can reach the riding location as early as possible.

In step S105A, a scheduled riding time T1 is calculated. The scheduled riding time T1 is either the longer of the time required to move from the current location to the riding location, and the time from the current time to the riding time. The time required to move from the current location to the riding location is acquired from the car navigation device 26A. For example, when the time required to move from the current location to the riding location is 15 minutes, and the time from the current time to the riding time is 1 hour, the scheduled riding time T1 is 1 hour. The time required to move from the current location to the riding location may be calculated by the vehicle ECU 10A rather than being acquired from the car navigation device 26A. Also, a communication device may be provided, and the time required to move from the current location to the riding location, calculated externally may be acquired. After calculation of the scheduled riding time T1, the flow proceeds to step S106A.

In step S106A, a scheduled air-conditioning time T2 is calculated. The scheduled air-conditioning time T2 is a time required from starting of air-conditioning to completion of the air-conditioning. The scheduled air-conditioning time T2 is determined by a characteristics map stored in the air-conditioning ECU 50A using the temperature difference between the current temperature inside the cabin measured by the internal air sensor 61A and the target temperature. The target temperature is the temperature inside the cabin input by the user by means of the reservation setting means 25A. The target temperature is, for example, 20° C. The scheduled air-conditioning time T2 may be determined from the temperature difference between the temperature inside the cabin and the target temperature by the function stored in the air-conditioning ECU 50A, rather than by the characteristics map. The scheduled air-conditioning time T2 may not be calculated from the target temperature or the like, but a time that is sufficient to reach the target temperature may be preliminarily set as the scheduled air-conditioning time T2. In this case, the scheduled air-conditioning time T2 is a fixed time, for example, 30 minutes. After calculation of the scheduled air-conditioning time T2, the flow proceeds to step S107A.

In step S107A, whether the scheduled riding time T1 is shorter than the total time of the scheduled air-conditioning time T2 and a buffer time T0 is determined. When the scheduled riding time T1 is shorter than the total time of the scheduled air-conditioning time T2 and the buffer time T0, the flow proceeds to step S108A. On the other hand, when the scheduled riding time T1 is longer than the total time of the scheduled air-conditioning time T2 and the buffer time T0, the flow proceeds to step S111A. Here, the buffer time T0 is a time to complete the air-conditioning earlier than the scheduled riding time T1. The buffer time T0 is, for example, 10 minutes. For example, when the scheduled air-conditioning time T2 is calculated as 20 minutes, the total time of the scheduled air-conditioning time T2 and the buffer time T0 is 30 minutes. Therefore, when the scheduled riding time T1 is less than 30 minutes, the flow proceeds to step S108A, and when the scheduled riding time T1 is more than 30 minutes, the flow proceeds to step S111A. The buffer time T0 may not be a fixed time. That is, the buffer time T0 may be calculated as a half time of the scheduled air-conditioning time T2.

In step S111A, the air-conditioning operation is stopped. In other words, when the air-conditioning operation has not been performed, the stopped state is maintained, and when the air-conditioning operation has been started yet, the air-conditioning operation is stopped. In the air-conditioning stopped state, driving of the room fan 71A and the condenser fan 74A is stopped, and the clutch 75A is uncoupled to stop energization to the heater 77A. In other words, the state in which energy consumption is reduced for every device used for air-conditioning operation is established. In the air-conditioning stopped state, energy consumption need not be reduced for all the devices used for air-conditioning operation. For example, only uncoupling of the clutch 75A that gives large effect of reducing the energy consumption may be performed. Also, only driving of the room fan 71A may be stopped while keeping the air-cooling preparation by the refrigerating cycle by making the clutch 75A in a coupling state, and rotating the condenser fan 74A. After stopping the air-conditioning, the flow proceeds to step S199A while the air-conditioning stopped state is maintained.

In step S108A, whether the scheduled riding time T1 is longer than the scheduled air-conditioning time T2 is determined. When the scheduled riding time T1 is longer than the scheduled air-conditioning time T2, the flow proceeds to step S151A. On the other hand, when the scheduled riding time T1 is shorter than the scheduled air-conditioning time T2, the flow proceeds to step S121A.

In step S121A, a preliminary air-conditioning operation before manned travel is performed in an early air-conditioning mode. The early air-conditioning mode is a mode in which air-conditioning is completed in a time shorter than the calculated scheduled air-conditioning time T2. In the early air-conditioning mode, the air-conditioning operation is performed in an internal air mode of taking in air through the internal air suction port. In the early air-conditioning mode, the number of revolutions of the room fan 71A is set to be higher than that in an energy saving air-conditioning mode. In the early air-conditioning mode, a stopping time is not provided for a device involved in the air-conditioning operation such as the room fan 71A, and the device is continuously operated. That is, the operation time of the device involved in the air-conditioning operation such as the room fan 71A is set to be longer than that in the energy saving air-conditioning mode.

The control during the early air-conditioning mode is not limited to the method as described above. For example, in an air-conditioning apparatus having a plurality of the room fans 71A, the number of operating room fans 71A may be increased in the early air-conditioning mode than in the energy saving air-conditioning mode. Alternatively, the number of revolutions of the compressor is set to be higher than that in the energy saving air-conditioning mode by setting the number of revolutions of the condenser fan 74A to be higher than that in the energy saving air-conditioning mode, and increasing the rotational speed of the engine 31A. Alternatively, the output of the heater 77A may be set to be larger than that in the energy saving air-conditioning mode. After execution of the air-conditioning operation in the early air-conditioning mode, the flow proceeds to step S199A while the air-conditioning operation is maintained.

In step S151A, a preliminary air-conditioning operation before manned travel is performed in a later-described energy saving air-conditioning mode. After execution of the air-conditioning operation in the energy saving air-conditioning mode, the flow proceeds to step S199A while the air-conditioning operation is maintained.

In step S199A, state parameters related with the air-conditioning control are stored. The state parameters to be stored includes human body detection information, riding location information, riding time information, scheduled riding time T1, scheduled air-conditioning time T2, air-conditioning mode under execution, vehicle speed, rotational speed of the engine 31A, temperature of engine cooling water, and outside air temperature. The air-conditioning ECU 50A maintains the air-conditioning operation on the basis of the state parameters stored in step S199A. Then, the flow again returns to step S101A, and the flow of air-conditioning control is repeated. In the flow of the second time or later, when the latest state parameters is newly acquired, for example, in step S101A, the air-conditioning control is conducted by using the latest state parameters in place of the stored state parameters. The stored state parameters is shared with the vehicle ECU 10A, and also used for control such as travel control, other than the air-conditioning control.

Figure 12:
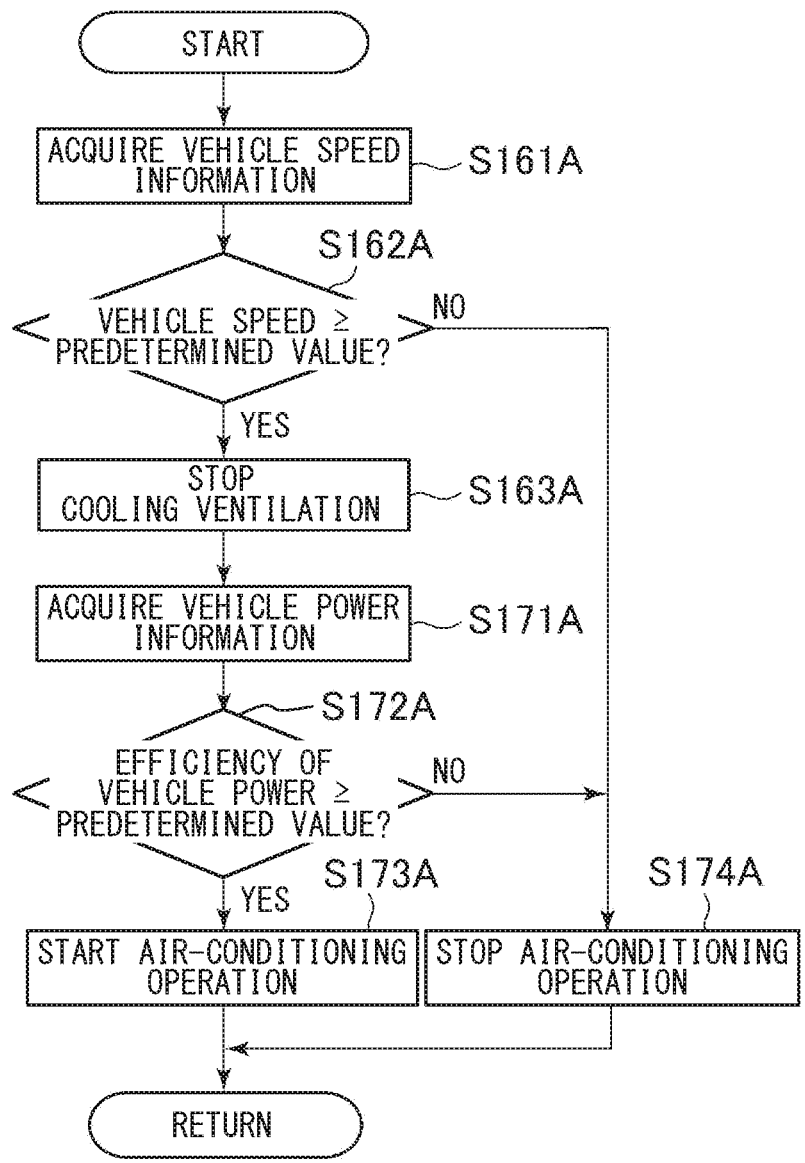
FIG. 12 is a flowchart of step S151 in the flowchart of FIG. 2.

Next, a control processing of the vehicle air-conditioning apparatus 1A in the energy saving air-conditioning mode which is step S151A is described. In starting the operation in the energy saving air-conditioning mode in FIG. 12, first, vehicle speed information is acquired in step S161A. The vehicle speed information is measured by the vehicle speed sensor 23A. In step S162A, whether the acquired vehicle speed is a predetermined value or more is determined. The predetermined value is, for example, 30 km per hour. When the vehicle speed is the predetermined value or more, the flow proceeds to step S163A. On the other hand, when the vehicle speed is less than the predetermined value, the flow proceeds to step S174A. Here, the state where the vehicle is stopped is a state where the vehicle speed is zero, and is included in the case where the vehicle speed is less than the predetermined value.

In step S163A, cooling ventilation is stopped. In other words, driving of the engine radiator fan 36A and the condenser fan 74A is stopped. As a result, the engine radiator and the condenser are cooled by receiving only the traveling wind accompanying the traveling of the vehicle. The energy consumed by the fan may be reduced by decreasing the number of revolutions rather than by completely stopping the ventilation in step S163A. After stopping driving of the fan, the flow proceeds to step S171A.

In step S171A, the rotational speed of the engine 31A is acquired as vehicle power information. The rotational speed of the engine 31A is measured by electrically detecting and counting the voltage applied to an ignition coil. The state that the rotational speed of the engine 31A is low is the state that the cooling loss of the engine 31A is large and the efficiency is poor. The state that the rotational speed of the engine 31A is high is the state that the mechanical loss of the engine 31A is large and the efficiency is poor. The state that the rotational speed of the engine 31A is moderate is the state that the cooling loss and the mechanical loss are ameliorated in good balance and the efficiency is the best.

As the vehicle power information, the temperature of the engine 31A may be acquired. The temperature of the engine 31A is acquired by measuring the temperature of the engine cooling water using the first water temperature sensor 24A. When the temperature of the engine cooling water is low, warm-up has not completed, and the combustion efficiency of the engine is poor, so that the efficiency of the engine 31A is low. When the temperature of the engine cooling water is high, warm-up has completed, and the combustion efficiency of gasoline is high, so that the efficiency of the engine 31A is high. After acquiring the vehicle power information, the flow proceeds to step S172A.

In step S172A, whether the efficiency of the vehicle power is high is determined. When determination is made on the basis of the rotational speed of the engine 31A, whether the rotational speed of the engine 31A is in a moderate rotational speed region is determined. That is, when the rotational speed of the engine 31A is in a moderate rotational speed region, it is determined that the efficiency of the engine 31A is a predetermined value or more. The moderate rotational speed region means a rotational speed region including the rotational speed capable of exerting the maximum efficiency ±500 rpm. Here, the maximum efficiency refers to the efficiency when the ratio of the output energy obtained as power to the input energy is the largest in the engine 31. Assuming that the rotational speed at which the maximum efficiency is obtained is 2000 rpm, the moderate rotational speed region is 1500 rpm to 2500 rpm. However, the rotational speed region where the efficiency of vehicle power is high is not limited to the above-described range as long as it is the rotational speed region including the rotational speed of the maximum efficiency.

When determination is made on the basis of the temperature of the engine 31A, whether the temperature of the engine cooling water is the warm-up completion temperature or more is determined. That is, when the temperature of the engine cooling water is the temperature of the warm-up completion temperature or more, it is determined that the efficiency of the engine 31A is a predetermined value or more. The warm-up completion temperature is, for example, 80° C. The warm-up completion temperature can be such a degree of temperature that implies completion of warm-up, and may be determined as the state that the efficiency of the vehicle power is high at a temperature slightly lower than the warm-up completion temperature. When the efficiency of the vehicle power is the predetermined value or more, the flow proceeds to step S173A. On the other hand, when the efficiency of the vehicle power is less than the predetermined value, the flow proceeds to step S174A.

In step S173A, an air-conditioning operation starts. In the energy saving air-conditioning mode, the driving time of the room fan 71A is made shorter than that in the manned air-conditioning mode to reduce the energy required for the air-conditioning operation as a total. Specifically, the room fan 71A is driven at a number of revolutions higher than the number of revolutions of the room fan 71 in the manned air-conditioning mode, and a large amount of air-conditioning wind is sent at once into the cabin.

In the energy saving air-conditioning mode, the air-conditioning operation is performed in an internal air mode of taking in air through the internal air suction port. The clutch 75A is brought into a coupling state to drive the compressor. Energization of the heater 77A is started. By adjusting the air mix door 73A to have an appropriate aperture, the cold wind and the warm wind are mixed to produce air-conditioning wind at a target temperature. When the target temperature of air-conditioning is low, the air-cooling operation may be performed only by the operation of the refrigerating cycle and the ventilation by driving of the compressor without energization of the heater 77A. When the target temperature of air-conditioning is high, the heating operation may be performed only by the energization of the heater 77A and the ventilation without driving of the compressor. The flow returns to the start of the energy saving air-conditioning mode while maintaining the air-conditioning operation, and repeats again the series of air-conditioning control.

In step S174A, the air-conditioning operation is temporarily stopped. In the air-conditioning stopped state, driving of the room fan 71A is stopped, and the clutch 75A is uncoupled to stop energization to the heater 77A. In other words, the air-conditioning stopped state is a state in which energy consumption is reduced for every device used for air-conditioning operation. In the air-conditioning stopped state, energy consumption may be reduced for a specific device rather than for all the devices used for air-conditioning operation.

According to the above-described embodiment, the air-conditioning operation is performed in the unmanned traveling state before manned travel, and the air-conditioning operation is not performed while the vehicle is parked, namely the vehicle is not traveling even in the unmanned state. Therefore, it is possible to cool the radiator such as a condenser by utilizing the traveling wind of the vehicle, and to reduce the energy consumption by driving of the engine radiator fan 36A and the condenser fan 74A. Further, since the vehicle power is not used for performing the air-conditioning operation while the vehicle is parked during which the vehicle power is not used for traveling, the energy consumption can be reduced. In other words, since there is no opportunity to drive the engine 31A only for the air-conditioning operation, the energy consumption can be reduced.

When the vehicle speed is a predetermined value or more, the air-conditioning operation accompanied by temperature adjustment is performed. Therefore, at the timing of receiving plenty of traveling wind of the vehicle, the air-conditioning operation consuming a lot of energy is performed. Therefore, it is possible to reduce the energy consumption for driving the engine radiator fan 36A and the condenser fan 74A, and it is possible to perform efficient air-conditioning. Further, since the engine 31A is not driven for the purpose of the air-conditioning operation while the vehicle is parked or traveling at low speed, the energy consumption can be reduced.

When the efficiency of the vehicle power is a predetermined value or more, the air-conditioning operation accompanied by temperature adjustment is performed.

Therefore, power of the air-conditioning operation can be ensured in the state that the efficiency of the engine 31A which is the vehicle power is high. Therefore, it is possible to reduce the energy consumed by the air-conditioning operation, and perform the air-conditioning efficiently.

In the manned air-conditioning mode, air-conditioning operation considering other factors of comfort such as noises besides the temperature is performed. This makes it possible to prevent deterioration in quietness due to the sounding of the room fan 71A. Therefore, it is possible to improve the comfort inside the cabin.

The seat heater is used only in the manned air-conditioning mode. In other words, the heating appliance that exerts high effect in the state that an occupant is seated is not used in the unmanned state in which an occupant is not seated. Therefore, it is possible to efficiently perform the heating operation while reducing unnecessary energy consumption in the heating operation.

In the energy saving air-conditioning mode and the early air-conditioning mode, the number of revolutions of the room fan 71A is increased compared with that in the manned air-conditioning mode. This makes it possible to quickly achieve air-conditioning by increasing the amount of wind in the cabin in an unmanned state where there is no need of ensuring the quietness, and thus it is possible to make the temperature inside the cabin approximate the target temperature quickly. Therefore, the total time of performing the air-conditioning operation can be reduced, and thus the energy consumed by the air-conditioning operation can be reduced.

The vehicle air-conditioning apparatus 1A performs the air-conditioning operation in the unmanned state on the basis of the scheduled riding information indicating information about the next expected manned state. Therefore, it is possible to perform preliminary air-conditioning when air-conditioning is needed, and thus it is possible to reduce the consumed energy in comparison with the case where the air-conditioning operation is usually continued as a preliminary air-conditioning state. Further, since the preliminary air-conditioning is performed before the vehicle becomes in a manned state, it is possible to improve the comfort in the cabin when an occupant rides in the vehicle. Further, even when the scheduled riding time T1 is extended due to an unexpected event such as traffic jam, unnecessary preliminary air-conditioning is stopped, and an air-conditioning operation can be performed at the optimum timing for starting of the preliminary air-conditioning.

As the scheduled riding information, the scheduled riding time T1 is calculated on the basis of the riding location information and the current location, and the scheduled riding time T1 and the scheduled air-conditioning time T2 are compared to determine starting of the preliminary air-conditioning. Therefore, it is possible to start the preliminary air-conditioning at an appropriate timing before reaching to the riding location. Therefore, it is possible to improve the comfort of the occupant getting into the cabin while controlling the energy consumed by the air-conditioning operation.

As the scheduled riding information, the scheduled riding time T1 is calculated on the basis of the riding time information and the current time, and the scheduled riding time T1 and the scheduled air-conditioning time T2 are compared to determine starting of the preliminary air-conditioning. Therefore, it is possible to start the preliminary air-conditioning at an appropriate timing before the riding time comes. Therefore, it is possible to improve the comfort of the occupant getting into the cabin while controlling the energy consumed in the air-conditioning operation.

When it is determined that the scheduled air-conditioning time T2 exceeds the scheduled riding time T1, the preliminary air-conditioning is performed in the early air-conditioning mode. Therefore, it is possible to reduce the impairment in comfort in the cabin due to incompletion of the air-conditioning when the occupant rides onto the vehicle.

Third Embodiment

This embodiment is a modified example of the embodiment based on the foregoing embodiments. In this embodiment, after completion of manned travel, a ventilation operation is performed in an unmanned driving state. In other words, ventilation is performed in an unmanned state after a manned state and before the next manned state.

Figure 13:
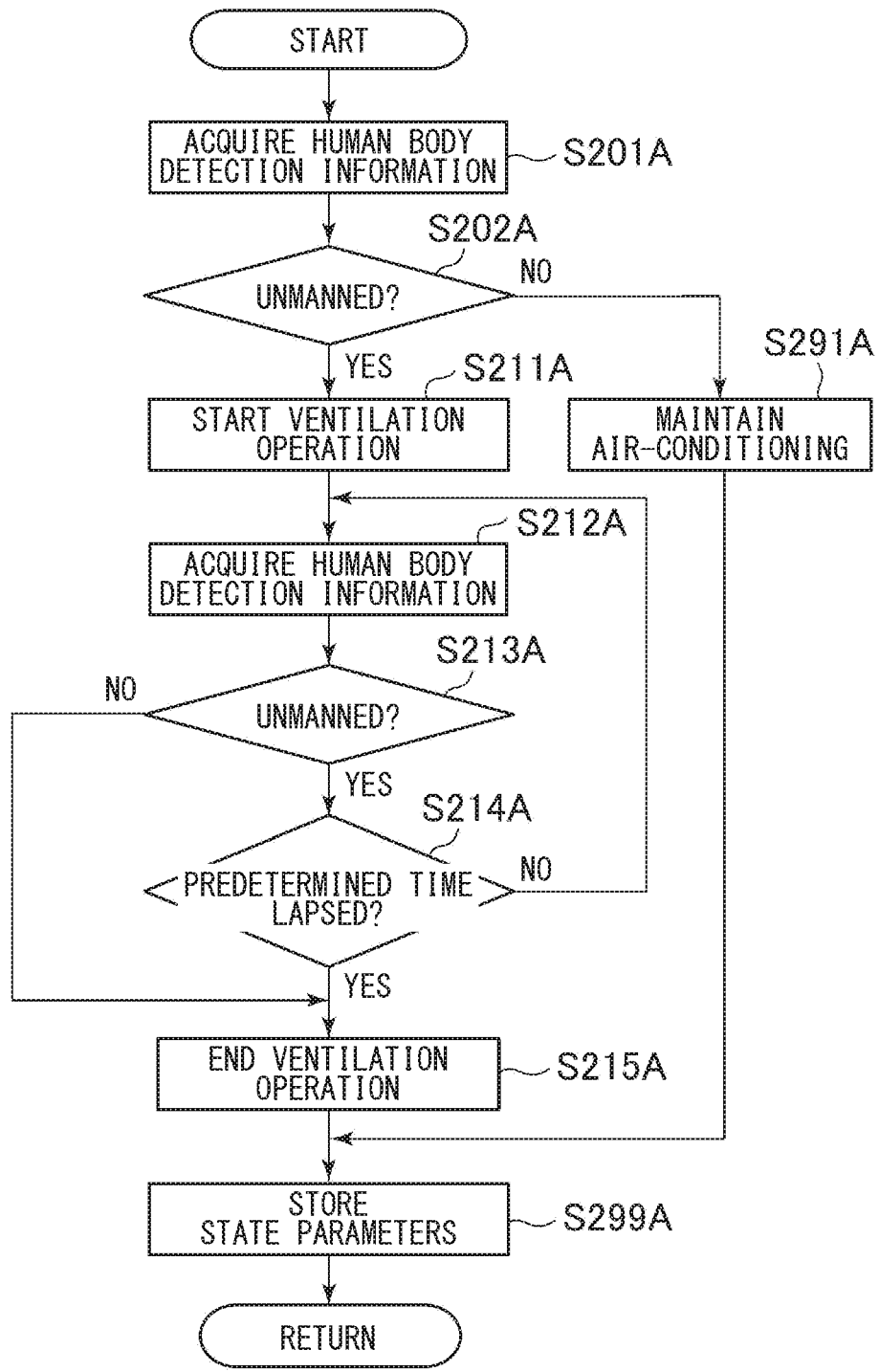
FIG. 13 is a flowchart regarding a ventilation operation of a third embodiment.

In FIG. 13, after completion of manned travel, presence or absence of a person inside the cabin is detected by using the human body detecting sensor 22A in step S201A. After detection of presence or absence of a person, whether the cabin is in an unmanned state is determined in step S202A. When it is determined that the cabin is in an unmanned state, the flow proceeds to step S211A. On the other hand, when it is determined that the cabin is not in an unmanned state, the flow proceeds to step S291A. In step S291A, the current air-conditioning mode is maintained. That is, even after completion of manned travel, the current air-conditioning mode is maintained if the vehicle remains in the manned state. Therefore, when the vehicle is in an automated air-conditioning state in a manned air-conditioning mode, the state is maintained. On the other hand, when air-conditioning is modified by an occupant, the modification of air-conditioning by the occupant is maintained. Then, the flow proceeds to step S299A.

In step S211A, a ventilation operation starts. In the ventilation operation, the suction port door 72A is switched to the external air mode, and the room fan 71A is driven, and the clutch 75A is uncoupled to stop energization to the heater 77A. That is, the devices required for adjusting the temperature such as air-cooling or heating are brought into a state where the energy consumption is zero or small. In this manner, the external air is introduced inside the cabin to replace the air inside the cabin. Further, much more external air may be taken into the cabin, for example, by opening the window 78A. Alternatively, the ventilation operation may be performed in such a manner that the air inside the cabin is discharged outside the cabin and the air outside the cabin is taken into the cabin only through the window 78A by opening the window 78A without driving the room fan 71A. Alternatively, the ventilation operation may be performed in such a manner that the air taken in through a front outside air opening is discharged from the front side of the cabin through the rear ventilator 80A by driving the room fan 71A and bringing each air outlet door 79A into an open state (the degree differs from vehicle to vehicle depending on the structure) without opening the window 78A. Alternatively, the ventilation operation may be performed by switching the mode to the external air mode, and driving the room fan 71A with the maximum amount of wind, and bringing all the air outlet doors 79A into an open state. The flow proceeds to step S212A while the ventilation operation is maintained.

In step S212A, presence or absence of a person inside the cabin is detected by using the human body detecting sensor 22A. After detection of presence or absence of a person, whether the cabin is in an unmanned state is determined in step S213A. When it is determined that the cabin is in an unmanned state, the flow proceeds to step S214A and the ventilation operation is continued. On the other hand, when it is determined that the cabin is not in an unmanned state, the flow proceeds to step S215A and the ventilation operation is ended.

In step S214A, whether a predetermined time has lapsed in the ventilation operation state is determined. The predetermined time is, for example, 10 minutes. When the predetermined time has not lapsed yet, the flow returns to step S212A while the ventilation operation is continued. That is, the ventilation operation is continued as long as the cabin is in an unmanned state until the predetermined time lapses. On the other hand, when the predetermined time has lapsed, the flow proceeds to step S215A. Completion of the ventilation may be determined on the basis of other factor than the lapsed time. For example, the ventilation operation may be continued until the difference in temperature between the outside temperature and the inside cabin temperature becomes a predetermined value or less.

In step S215A, the ventilation operation ends. That is, the suction port door 72A is switched to the internal air mode, and driving of the room fan 71A is stopped. When the window 78A is open, the window 78A is closed. Uncoupling of the clutch 75A and stopping of energization to the heater 77A are maintained. After end of the ventilation operation, the flow proceeds to step S299A.

In step S299A, the state parameters regarding the air-conditioning control is acquired. The state parameters to be stored is, for example, human body detection information, a lapse time from completion of the ventilation operation, and the like. After end of the ventilation operation, the air-conditioning ECU 50A stops the air-conditioning operation until the next air-conditioning operation in a manned air-conditioning mode or preliminary air-conditioning before manned traveling. When the ventilation operation has not been performed for a predetermined time from the previous ventilation operation, the ventilation operation may be compulsorily performed in an unmanned state. For example, when the ventilation operation has not been performed for 24 hours since the previous ventilation operation, the ventilation operation may be compulsorily performed. Also, the ventilation operation may be performed several times during the period from the last manned state to the next manned state.

According to the above-described embodiment, the ventilation operation is started after the manned state is switched to the unmanned state. In other words, the ventilation operation is performed in an unmanned state after a manned state ends and before the next manned state. Therefore, the ventilation operation can eliminate the state that the odor generated in the manned state fills the cabin, or the state that the humidity in the cabin is high. Therefore, it is possible to let the next occupant ride after the cabin space is made comfortable. Also, it is possible to prevent the odor from being fixed to the parts such as seats constituting the cabin. Also, it is possible to effectively prevent growth of mold due to retention of the high humid state. Also, it is possible to remove viruses and so on taken into the cabin by an occupant. Therefore, it is easy to keep a hygienic cabin environment.

The ventilation operation is performed in an unmanned state. Therefore, it is possible to prevent the impairment in comfort in the cabin space due to temporal approximation of the inside cabin temperature to the outside temperature in association with the ventilation operation, from influencing on an occupant.

When the vehicle becomes in a manned state during the ventilation operation, the ventilation operation is ended. Therefore, rapid transition to the air-conditioning control corresponding to the manned state can be realized. Therefore, it is possible to reduce the time during which the comfort inside the cabin is low although there is an occupant in the vehicle.

The ventilation operation is performed before preliminary air-conditioning operation in an unmanned state. Therefore, it is possible to prevent the air-conditioned air from exiting the vehicle for ventilation due to the need of ventilation after preliminary air-conditioning. Therefore, preliminary air-conditioning can be performed at an appropriate timing after ventilation, so that it is possible to reduce the energy consumed by air-conditioning.

The ventilation operation need not be performed directly after the manned state is switched to the unmanned state. That is, the ventilation operation may be performed directly before performing an air-conditioning operation involving the temperature adjustment as preliminary air-conditioning. According to this, since it is possible to introduce fresh air inside the cabin directly before the air-conditioning operation involving the temperature adjustment, it is easy to keep the cabin space in a comfortable condition for a long time.

The ventilation operation may be executed in a manned state. That is, the ventilation operation may be executable by an operation of an occupant. As a result, it is possible to perform ventilation by an air-conditioning operation by an occupant even when the ventilation is insufficient, or when the cabin is filled with odor after ventilation. Therefore, it is possible to make the cabin space comfortable.

Fourth Embodiment

This embodiment is a modified example of the embodiment based on the foregoing embodiments. In this embodiment, a motor 332A in place of the engine 31A is used as the vehicle power. That is, the vehicle air-conditioning apparatus 1A is mounted on a vehicle such as an electric car using the motor 332A as a vehicle power.

Figure 14:
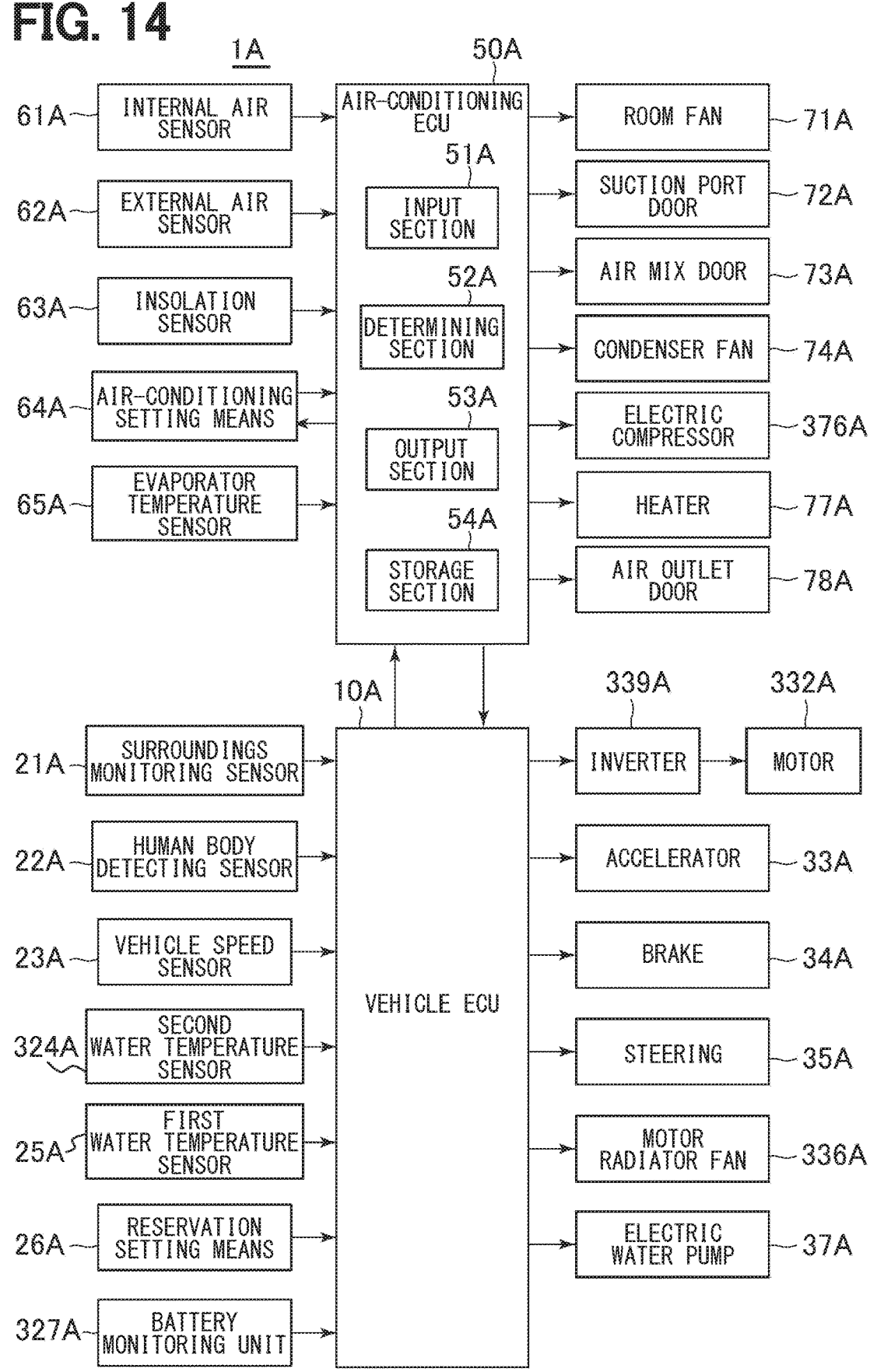
FIG. 14 is a block diagram of a vehicle air-conditioning apparatus of a fourth embodiment.

In FIG. 14, the vehicle ECU 10A is connected to a second water temperature sensor 324A rather than the first water temperature sensor 24A. The second water temperature sensor 324A is a temperature sensor disposed in a circulating path of the cooling water that cools the heat generating components such as the motor 332A, an inverter 339A, and a battery. The second water temperature sensor 324A detects the temperature of the cooling water directly after the temperature rises by heat exchange with the motor 332A.

The vehicle ECU 10A is connected to a battery monitoring unit 327A. The battery monitoring unit 327A is a unit of monitoring the battery that supplies electric components such as the motor 332A with electric power. The battery monitoring unit 327A detects the amount of electricity stored in the battery. The vehicle ECU 10A takes out electricity from the battery at the time of acceleration, and drives the motor 332A. On the other hand, power is generated in the motor 332A at the time of deceleration and the electricity is stored in the battery.

The vehicle ECU 10A is connected to the motor 332A via the inverter 339A rather than the engine 31A. The inverter 339A is a device that converts direct current to alternate current. The motor 332A is vehicle power for the vehicle to travel. The motor 332A converts the electric energy supplied from the battery to the mechanical energy.

The vehicle ECU 10A is connected to a motor radiator fan 336A rather than the engine radiator fan 36A. The motor radiator fan 336A is an air blower that sends air to the motor radiator which is a radiator in which the cooling water that cools the motor 332A and the like circulates. The motor radiator fan 336A is provided in front of the motor radiator disposed in a front part of the vehicle. In other words, the motor radiator fan 336A is disposed facing the motor radiator. The motor radiator fan 336A sends air from the front part toward the rear part of the vehicle. In other words, the air is sent in the same direction as the direction of the wind received by the traveling vehicle.

The air-conditioning ECU 50A is connected to an electric compressor 376A rather than the clutch 75A. The electric compressor 376A is a compressor constituting the refrigerating cycle for air-cooling. The electric compressor 376A is controlled by the air-conditioning ECU 50A regarding on/off of its driving and the intensity of the output. Driving of the electric compressor 376A is independent of driving of the motor 332A. That is, vehicle power is not used for the control related with air-conditioning operation. When an air-cooling operation is performed, the electric compressor 376A is driven to supply the evaporator with a coolant.

Figure 15:
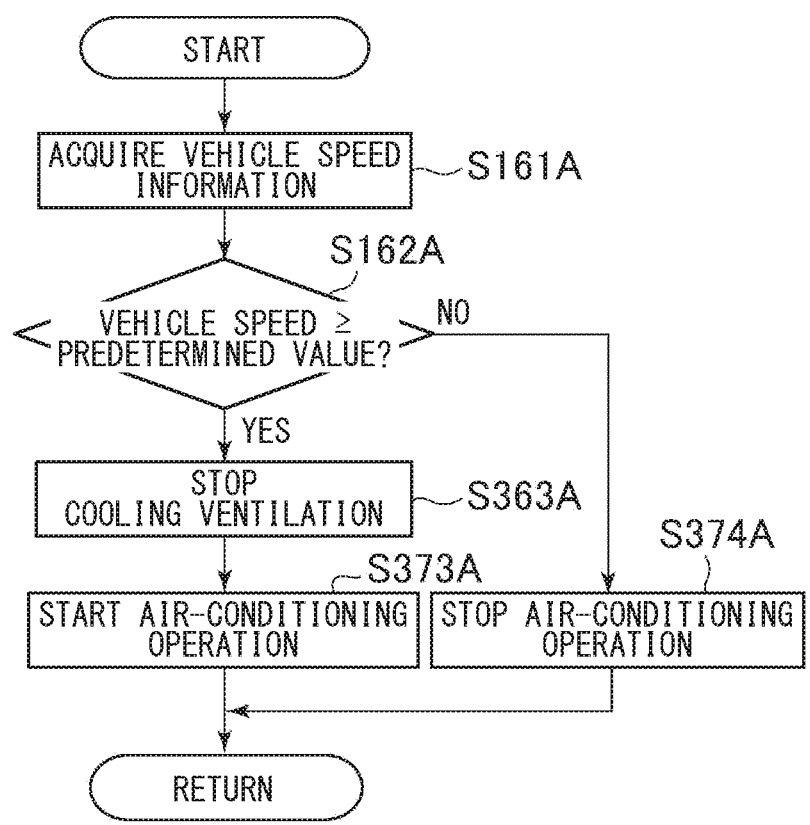
FIG. 15 is a flowchart regarding control of the fourth embodiment.

In FIG. 15, the step denoted by the same step number as that in the foregoing embodiments indicates the same process, and the same operation and effect are exerted. In the following, the content different from that in the foregoing embodiments is described.

In step S162A in the energy saving air-conditioning mode, whether the acquired vehicle speed is a predetermined value or more is determined. The predetermined value is, for example, 30 km per hour. When the vehicle speed is the predetermined value or more, the flow proceeds to step S363A. On the other hand, when the vehicle speed is less than the predetermined value, the flow proceeds to step S374A. Here, the state that the vehicle is stopped is included in the case where the vehicle speed is less than the predetermined value.

In step S363A, cooling ventilation is stopped. In other words, driving of the motor radiator fan 336A and the condenser fan 74A is stopped. As a result, the motor radiator and the condenser are cooled while they receive only the traveling wind accompanying the traveling of the vehicle. The energy consumed by the air blower may be reduced by decreasing the number of revolutions rather than by completely stopping the ventilation in step S363A. After stopping driving of the fan, the flow proceeds to step S373A.

In step S373A, an air-conditioning operation starts. Specifically, the room fan 71A is driven at a number of revolutions higher than the number of revolutions of the room fan 71A in the manned air-conditioning mode. Also, the electric compressor 376A is driven. Alternatively, energization of the heater 77A is started. By appropriately adjusting the degree of opening of the air mix door 73A, the cold wind and the warm wind are mixed to produce air-conditioning wind at a target temperature. The flow returns to the start of the energy saving air-conditioning mode while maintaining the air-conditioning operation, and repeats again the series of air-conditioning control.

In step S374A, the air-conditioning operation is temporarily stopped. In the air-conditioning stopped state, driving of the room fan 71A is stopped, and energization to the electric compressor 376A and the heater 77A is stopped. In other words, the air-conditioning stopped state is a state in which energy consumption is reduced for every device used for air-conditioning operation. In the air-conditioning stopped state, energy consumption may be reduced for a specific device rather than for all the devices used for air-conditioning operation. That is, driving may be stopped for the two devices used for adjusting the temperature, i.e., the electric compressor 376A and the heater 77A, and driving may be continued for other devices. The flow returns to the start of the energy saving air-conditioning mode while maintaining this stopping state, and repeats again the series of air-conditioning control.

According to the above-described embodiment, the preliminary air-conditioning operation before manned travel is not performed while the vehicle is parked, namely the vehicle is not traveling even in the unmanned state. Therefore, it is possible to achieve cooling by utilizing the traveling wind of the vehicle, and to reduce the energy consumed by driving of the motor radiator fan 336A and the condenser fan 74A.

When the vehicle speed is a predetermined value or more, the air-conditioning operation accompanied by temperature adjustment is performed. Therefore, at the timing of receiving plenty of traveling wind of the vehicle, the air-conditioning operation consuming a lot of energy is performed. Therefore, it is possible to reduce the energy consumption by driving of the motor radiator fan 336A and the condenser fan 74A, and it is possible to perform efficient air-conditioning.

OTHER EMBODIMENTS

The disclosure in this description is not limited to the illustrated embodiments. The disclosure encompasses the illustrated embodiments and modified forms based on the embodiments made by a person skilled in the art. For example, the disclosure is not limited to combinations of components and/or elements indicated in the embodiments. The disclosure can be practiced in various combinations. The disclosure may include an additional part that can be added to the embodiments. The disclosure encompasses those in which components and/or elements in the embodiments are omitted. The disclosure encompasses replacements or combinations of components and/or elements between one embodiment and another embodiment. The disclosed technical ranges are not limited by the description of the embodiments. It should be understood that some disclosed technical ranges are indicated by description of claims, and includes every modification within the equivalent meaning and the scope of description of claims.

Description has been made for two types of vehicles, namely, a vehicle equipped with an engine, and a vehicle equipped with a motor, the vehicle air-conditioning apparatus 1 may be applied to, for example, a hybrid car that travels differently using the two types of vehicle power, namely the engine and the motor.

The invention claimed is:

1. An air-conditioning control apparatus mounted in an automated driving vehicle, the apparatus comprising:
   an occupant determining section that is configured to determine whether an occupant is in the automated driving vehicle;
   an air-conditioning controlling section that is configured to execute an air-conditioning control by exchanging an inside air in a vehicle cabin with an outside air when the occupant determining section determines that the automated driving vehicle is in an unmanned state;

a travel determining section that is configured to determine whether the automated driving vehicle is traveling;
an inside cabin temperature detecting section that is configured to detect an inside cabin temperature of the automated driving vehicle; and
an outside cabin temperature detecting section that is configured to detect an outside cabin temperature of the automated driving vehicle, wherein
the air-conditioning controlling section is further configured to serve as a window operation controlling section that executes the air-conditioning control by operating a window of the automated driving vehicle when determination results of the occupant determining section and the travel determining section indicate the automated driving vehicle is traveling in the unmanned state, and
the window operation controlling section is further configured to determine controlling conditions for the air-conditioning control based on the inside cabin temperature and the outside cabin temperature.

2. The air-conditioning control apparatus according to claim 1, wherein
the air-conditioning controlling section is further configured to execute the air-conditioning control after the automated driving vehicle changes to the unmanned state from a manned state.

3. The air-conditioning control apparatus according to claim 1, wherein
the air-conditioning controlling section is further configured to stop the air-conditioning control when the automated driving vehicle changes to a manned state from the unmanned state.

4. The air-conditioning control apparatus according to claim 1, wherein
the window operation controlling section is further configured to:
refrain from executing the air-conditioning control when the inside cabin temperature falls within a proper temperature range; and
execute the air-conditioning control so that the inside cabin temperature falls within the proper temperature range when the inside cabin temperature does not fall within the proper temperature range.

5. The air-conditioning control apparatus according to claim 4, wherein
the window operation controlling section is further configured to increase an opening degree of the window as the air-conditioning control when:
the inside cabin temperature is higher than the proper temperature range and the inside cabin temperature is higher than the outside cabin temperature; or
the inside cabin temperature is lower than the proper temperature range and the inside cabin temperature is lower than the outside cabin temperature.

6. The air-conditioning control apparatus according to claim 5, wherein
the window operation controlling section is further configured to decrease an opening degree of the window as the air-conditioning control when:
the inside cabin temperature is higher than the proper temperature range and the inside cabin temperature is not higher than the outside cabin temperature; or
the inside cabin temperature is lower than the proper temperature range and the inside cabin temperature is not lower than the outside cabin temperature.

7. The air-conditioning control apparatus according to claim 1, wherein
the travel determining section is further configured to acquire vehicle speed information including information indicating a vehicle speed of the automated driving vehicle or information associated with a vehicle speed of the automated driving vehicle, and
the window operation controlling section is further configured to determine controlling conditions for the air-conditioning control in light of the vehicle speed information.

8. The air-conditioning control apparatus according to claim 7, wherein
the window operation controlling section is further configured to refrain from executing the air-conditioning control, and close the window if the window is open, when the vehicle speed information no longer indicates the automated driving vehicle is traveling at a speed equal to or greater than a predetermined threshold speed.

9. The air-conditioning control apparatus according to claim 8, wherein
the window operation controlling section is further configured to adjust the opening degree of the window in the air-conditioning control based on the vehicle speed information when the vehicle speed information indicates the automated driving vehicle is traveling at a speed equal to or greater than the predetermined threshold speed and the air-conditioning control is continuously executed.

10. The air-conditioning control apparatus according to claim 9, wherein
the window operation controlling section is further configured to adjust, when the vehicle speed information indicates that the vehicle is traveling at a low speed, the opening degree of the window to be less than that of the window when the vehicle is traveling at a high speed greater than the low speed.

11. The air-conditioning control apparatus according to claim 1, further comprising:
a wind velocity detecting section that is configured to detect wind velocity information indicating a velocity of wind entering the vehicle cabin, wherein
the window operation controlling section is further configured to determine controlling conditions of the air-conditioning control in light of the wind velocity information.

12. The air-conditioning control apparatus according to claim 1, further comprising:
a refrigerating cycle air-conditioning controlling section that is configured to control a vehicle air-conditioning apparatus configured to perform cabin air-conditioning using a conditioned air having a temperature adjusted by a refrigerating cycle system mounted in the automated driving vehicle; and
a remaining travel calculating section that is configured to calculate a scheduled traveling time for which the automated driving vehicle is expected to be in the unmanned state until an occupant rides in the automated driving vehicle, wherein
the window operation controlling section is further configured to stop the air-conditioning control, and close the window if the window is open, and the refrigerating cycle air-conditioning controlling section is further configured to execute the cabin air-conditioning by operating the refrigerating cycle system, when a required time to have the inside cabin temperature fall within a proper temperature range by the vehicle air-conditioning apparatus is equal to or less than the scheduled traveling time.

13. The air-conditioning control apparatus according to claim 1, further comprising:
an invading object determining section that is configured to determine whether an outside object likely entering the cabin of the automated driving vehicle exists, wherein
the window operation controlling section is further configured to refrain from executing the air-conditioning control, and close the window if the window is open, when a determination result of the invading object determining section indicates that an outside object likely entering the cabin exists.

14. The air-conditioning control apparatus according to claim 1, further comprising:
a weather information acquiring section that is configured to acquire weather information, wherein
the window operation controlling section is further configured to refrain from executing the air-conditioning control, and close the window if the window is open, when the weather information acquired by the weather information acquiring section indicates bad weather.

15. An air-conditioning control apparatus mounted in an automated driving vehicle, the apparatus comprising
a processor programmed to:
determine whether an occupant is in the automated driving vehicle;
execute an air-conditioning control by exchanging an inside air in a vehicle cabin with an outside air upon determining that the automated driving vehicle is in an unmanned state;
determine whether the automated driving vehicle is traveling;
detect an inside cabin temperature of the automated driving vehicle; and
detect an outside cabin temperature of the automated driving vehicle, wherein
the processor is further programmed to:
execute the air-conditioning control by operating a window of the automated driving vehicle upon determining that the automated driving vehicle is traveling in the unmanned state; and
determine controlling conditions for the air-conditioning control based on the inside cabin temperature and the outside cabin temperature.

16. The air-conditioning control apparatus according to claim 15, wherein
the processor is further programmed to execute the air-conditioning control after the automated driving vehicle changes to the unmanned state from a manned state.

17. The air-conditioning control apparatus according to claim 15, wherein
the processor is further programmed to stop the air-conditioning control when the automated driving vehicle changes to a manned state from the unmanned state.

18. The air-conditioning control apparatus according to claim 15, wherein
the processor is further programmed to:
refrain from executing the air-conditioning control when the inside cabin temperature falls within a proper temperature range; and
execute the air-conditioning control so that the inside cabin temperature falls within the proper temperature range when the inside cabin temperature does not fall within the proper temperature range.

19. The air-conditioning control apparatus according to claim 18, wherein
the processor is further programmed to increase an opening degree of the window as the air-conditioning control when:
the inside cabin temperature is higher than the proper temperature range and the inside cabin temperature is higher than the outside cabin temperature; or
the inside cabin temperature is lower than the proper temperature range and the inside cabin temperature is lower than the outside cabin temperature.

20. The air-conditioning control apparatus according to claim 19, wherein
the processor is further programmed to decrease an opening degree of the window as the air-conditioning control when:
the inside cabin temperature is higher than the proper temperature range and the inside cabin temperature is not higher than the outside cabin temperature; or
the inside cabin temperature is lower than the proper temperature range and the inside cabin temperature is not lower than the outside cabin temperature.

* * * * *